US012608426B2

(12) United States Patent
Watanabe et al.

(10) Patent No.: US 12,608,426 B2
(45) Date of Patent: Apr. 21, 2026

(54) INFORMATION PROCESSING APPARATUS, INFORMATION PROCESSING SYSTEM, INFORMATION PROCESSING METHOD, AND NON-TRANSITORY RECORDING MEDIUM

(71) Applicants: Genki Watanabe, Tokyo (JP); Keisuke Iwasa, Tokyo (JP)

(72) Inventors: Genki Watanabe, Tokyo (JP); Keisuke Iwasa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 18/512,507

(22) Filed: Nov. 17, 2023

(65) Prior Publication Data
US 2024/0168998 A1 May 23, 2024

(30) Foreign Application Priority Data
Nov. 22, 2022 (JP) ................................. 2022-186580

(51) Int. Cl.
| | |
|---|---|
| *G06F 17/00* | (2019.01) |
| *G06F 7/00* | (2006.01) |
| *G06F 16/903* | (2019.01) |
| *G06F 16/9038* | (2019.01) |
| *G06F 16/906* | (2019.01) |

(52) U.S. Cl.
CPC .... *G06F 16/9038* (2019.01); *G06F 16/90344* (2019.01); *G06F 16/906* (2019.01)

(58) Field of Classification Search
CPC ............... G06F 16/9038; G06F 16/906; G06F 16/90344

USPC ........................................................ 707/722
See application file for complete search history.

(56) References Cited

U.S. PATENT DOCUMENTS

| | | | |
|---|---|---|---|
| 11,593,439 B1 * | 2/2023 | Avadhani .............. | G06F 16/325 |
| 2004/0093323 A1 * | 5/2004 | Bluhm ................... | G06F 16/93 |
| | | | 707/999.003 |
| 2005/0132342 A1 * | 6/2005 | Van Lunteren ... | G06F 16/90344 |
| | | | 717/143 |
| 2006/0104518 A1 * | 5/2006 | Yang ................. | G06F 16/90344 |
| | | | 707/E17.039 |

(Continued)

FOREIGN PATENT DOCUMENTS

| | | |
|---|---|---|
| JP | 2009-087037 A | 4/2009 |
| JP | 2023-081570 A | 6/2023 |

*Primary Examiner* — Pavan Mamillapalli
(74) *Attorney, Agent, or Firm* — IPUSA, PLLC

(57) ABSTRACT

An information processing apparatus, an information processing system, an information processing method, and a non-transitory recording medium. The information processing apparatus receives an information type of a collection target and a character string related to the collection target, compares first information obtained by analyzing the character string and each of a plurality of items of second information to generate a comparison result, each second information being obtained by analyzing each of a plurality of items of data stored in one or more memories, and generates display information, the display information causing a display to display information according to the information type of the collection target, from among information related to target data, the target data being one or more items of the data selected based on the comparison result.

20 Claims, 22 Drawing Sheets

(56) References Cited

U.S. PATENT DOCUMENTS

| | | | | |
|---|---|---|---|---|
| 2006/0195468 A1* | 8/2006 | Yanagi | .................... | G06F 16/90 |
| | | | | 707/999.102 |
| 2009/0171955 A1* | 7/2009 | Merz | ................ | G06F 16/90344 |
| 2011/0191326 A1* | 8/2011 | Gutlapalli | ............... | G06F 3/048 |
| | | | | 707/723 |
| 2018/0197045 A1* | 7/2018 | Zhang | .................. | G06V 30/414 |
| 2019/0087386 A1* | 3/2019 | Ono | ........................ | G06Q 10/06 |
| 2020/0372106 A1* | 11/2020 | Liu | ........................ | G06N 20/00 |
| 2020/0409684 A1 | 12/2020 | Shibukawa et al. | | |
| 2020/0409685 A1 | 12/2020 | Shimomoto et al. | | |
| 2020/0412901 A1 | 12/2020 | Watanabe | | |
| 2021/0109838 A1 | 4/2021 | Watanabe | | |
| 2022/0327310 A1* | 10/2022 | Tzoref-Brill | ......... | G06V 30/418 |
| 2023/0153098 A1 | 5/2023 | Shibukawa et al. | | |

* cited by examiner

Information type: | Document ▼ | ~511

512

· · · · · · · · · · · · · · · · · · · · · · · · · · · · · · · · · · · · · · ·
· · · · · · · · · · · · · · · · · · · · · · · · · · · · · · · · · · · ·
· · · · · · · · · · · · · · · · · · · · · · · · · · · · · · · · ·

513

( 🎤 )     ( Execute )

| DOCUMENT ID | DOCUMENT NAME | DOCUMENT VECTOR |
|---|---|---|
| 000001 | · · · | · · · · · · |
| 000002 | · · · | · · · · · · |
| ⋮ | ⋮ | ⋮ |

FIG. 8

| DOCUMENT ID | DOCUMENT NAME | CREATOR | UPDATE HISTORY | FILE PATH | SUMMARY | ACCESS CONTROL INFORMATION | LABEL LIST | ⋯ |
|---|---|---|---|---|---|---|---|---|
| 000001 | ⋮ | ⋮ | ⋮ | ⋮ | ⋮ | ⋮ | ⋮ | ⋮ |
| 000002 | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |

| No | DOCUMENT NAME | SIMILARITY |
|---|---|---|
| 1 | SPACE BUSINESS DEVELOPMENT.PDF | 0.96 |
| 2 | MANNED SPACE FLIGHT PLAN.PDF | 0.82 |
| 3 | SPACE DEVELOPMENT ELEMENTAL TECHNOLOGY.PDF | 0.81 |
| ⋮ | ⋮ | ⋮ |
| N | ⋮ | ⋮ |

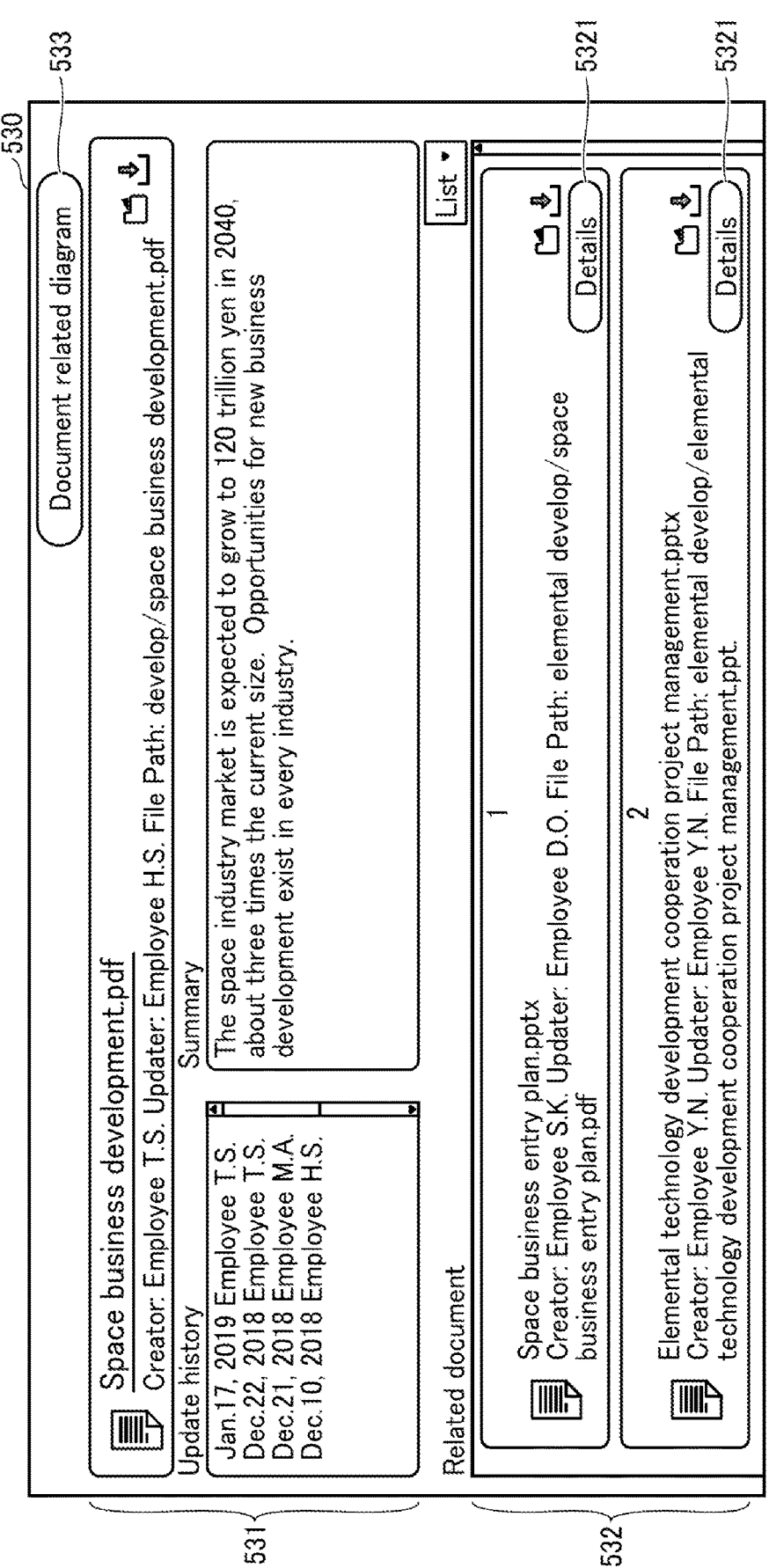

530

533

Document related diagram

531

Space business development.pdf
Creator: Employee T.S. Updater: Employee H.S. File Path: develop/space business development.pdf Update history
Jan.17, 2019 Employee T.S.
Dec.22, 2018 Employee T.S.
Dec.21, 2018 Employee M.A.
Dec.10, 2018 Employee H.S.

Summary
The space industry market is expected to grow to 120 trillion yen in 2040, about three times the current size. Opportunities for new business development exist in every industry.

List ▼

532

Related document

1
Space business entry plan.pptx
Creator: Employee S.K. Updater: Employee D.O. File Path: elemental develop/space business entry plan.pdf Details       5321

2
Elemental technology development cooperation project management.pptx
Creator: Employee Y.N. Updater: Employee Y.N. File Path: elemental develop/elemental technology development cooperation project management.ppt.

Details       5321

FIG. 14

START

S251
EXTRACT LABEL FROM SELECTED DOCUMENT

S252
CLUSTER SELECTED DOCUMENTS

S253
LABEL EACH CLASS

S254
STORE WORKSPACE

END

| WORK-SPACE ID | WORK-SPACE NAME | LABEL | CREATOR | UPDATER | QUERY | NUMBER OF USES | EVALUATION SCORE | BELONGING DATA ID | BELONGING DATA PATH | BELONGING CLASS LABEL |
|---|---|---|---|---|---|---|---|---|---|---|
| 1 | WORK-SPACE 1 | Label 1 Label 2 Label 3 | CREATOR A | UPDATER D | QUERY 1 | ... | 4.5 | 000001 | PATH A | CATEGORY A |
| | | | | | | | | 000002 | PATH B | CATEGORY B |
| | | | | | | | | ... | PATH C | CATEGORY C |
| 2 | WORK-SPACE 2 | Label 4 Label 5 Label 6 | CREATOR B | UPDATER E | QUERY 2 | ... | 4.2 | ... | PATH D | |
| | | | | | | | | ... | PATH E | |
| | | | | | | | | ... | PATH F | CATEGORY D |
| | | | | | | | | ... | PATH G | |
| 3 | WORK-SPACE 3 | Label 7 Label 8 Label 9 | CREATOR C | UPDATER F | QUERY 3 | ... | 3.2 | 000001 | PATH A | CATEGORY E |
| | | | | | | | | ... | PATH H | |
| | | | | | | | | ... | PATH I | |
| | | | | | | | | ... | PATH J | CATEGORY F |
| | | | | | | | | ... | PATH K | |
| | | | | | | | | ... | PATH L | CATEGORY G |
| ... | ... | ... | ... | ... | ... | ... | ... | ... | ... | ... |

| No | EXPERT ID | RELEVANCE |
|---|---|---|
| 1 | EMPLOYEE T.S | 23.89 |
| 2 | EMPLOYEE T.N | 13.87 |
| 3 | EMPLOYEE K.J | 10.09 |
| ⋮ | ⋮ | ⋮ |

| No | WORKSPACE NAME | RELEVANCE |
|---|---|---|
| 1 | SPACE BUSINESS DEVELOPMENT | 34.89 |
| 2 | SPACE INDUSTRY VENTURE | 32.71 |
| 3 | SPACE DEVELOPMENT PROJECT | 29.08 |
| ⋮ | ⋮ | ⋮ |

FIG. 24

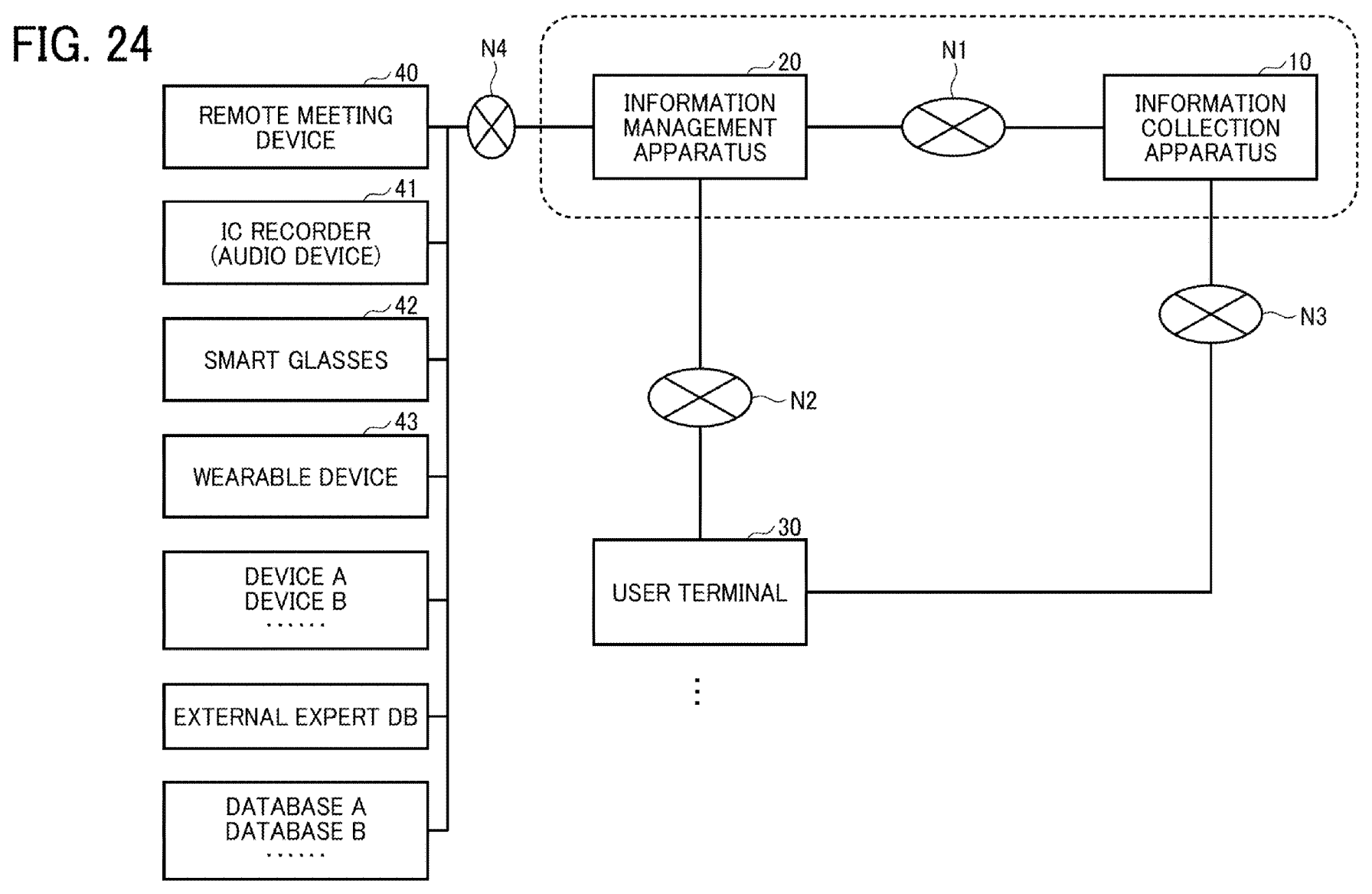

INFORMATION COLLECTION APPARATUS 10

N3

N1

INFORMATION MANAGEMENT APPARATUS 20

N2

USER TERMINAL 30

...

N4

REMOTE MEETING DEVICE 40

IC RECORDER (AUDIO DEVICE) 41

SMART GLASSES 42

WEARABLE DEVICE 43

DEVICE A
DEVICE B
......

EXTERNAL EXPERT DB

DATABASE A
DATABASE B
......

FIG. 26

| MEETING NAME | DATE | PARTICIPANT | | SUBJECT | MATERIAL TYPE | MATERIAL ID | ... |
|---|---|---|---|---|---|---|---|
| XX MEETING | MM/DD/YY | ....... | ....... | DEVELOPMENT | MEETING MINUTES | ...... | ... |
| | | ... (PARTICIPANT 2) | ....... | DEVELOPMENT | VIDEO RECORDING | HTTPS://XXX | ... |
| | | | ....... | DEVELOPMENT | : | : | ... |
| : | : | : | | : | : | : | ... |

FIG. 27

| DOCUMENT ID | MEETING NAME, DATE | SUBJECT | RELATED MATERIAL ID | ... |
|---|---|---|---|---|
| FILE 1 (MEETING MINUTES) | MM/DD/YY XX MEETING | DEVELOPMENT | HTTPS://XXX | ... |
| FILE 5 (DOCUMENT) | | DEVELOPMENT | | ... |
| PARTICIPANT 2 | MM/DD/YY ZZ MEETING | DEVELOPMENT | HTTPS://ZZZ | ... |
| : | : | : | : | ... |

1

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-186580, filed on Nov. 22, 2022, in the Japan Patent Office, the entire disclosure of which is hereby incorporated by reference herein.

BACKGROUND

Technical Field

The present disclosure relates to an information processing apparatus, an information processing system, an information processing method, and a non-transitory recording medium.

Background Art

Persons engaged in work inside or outside the office (hereinafter referred to as "users") may wish to collect and utilize various information such as materials, human resources, and organizational knowledge useful for the work.

For example, various departments such as a planning department, a research and development department, and a human resources department create many plans and proposals day by day, so various information (meeting minutes, plans, proposals, design books, papers, and the like) is stored as internal assets. Since such scattered information (information including documents, human resources, and the like) is enormous, the users may feel inconvenience in utilizing such information assets in creating plans and proposals.

In addition, useful information assets are not limited to inside the company but often scattered outside the company and the users wish to access appropriate (useful) information (such as relevant knowledge) at an appropriate timing.

SUMMARY

Embodiments of the present disclosure describe an information processing apparatus, an information processing system, an information processing method, and a non-transitory recording medium.

According to one embodiment, the information processing apparatus receives an information type of a collection target and a character string related to the collection target, compares first information obtained by analyzing the character string and each of a plurality of items of second information to generate a comparison result, each second information being obtained by analyzing each of a plurality of items of data stored in one or more memories, and generates display information, the display information causing a display to display information according to the information type of the collection target, from among information related to target data, the target data being one or more items of the data selected based on the comparison result.

According to one embodiment, the information processing system receives an information type of a collection target and a character string related to the collection target, compares first information obtained by analyzing the character string and each of a plurality of items of second information to generate a comparison result, each second information being obtained by analyzing each of a plurality of items of data stored in one or more memories, and generates display information, the display information causing a display to display information according to the information type of the collection target, from among information related to target data, the target data being one or more items of the data based on the comparison result.

According to one embodiment, the information processing method includes receiving an information type of a collection target and a character string related to the collection target, comparing first information obtained by analyzing the character string and each of a plurality of items of second information to generate a comparison result, each second information being obtained by analyzing each of a plurality of items of data stored in one or more memories, and generating display information, the display information causing a display to display information according to the information type of the collection target, from among information related to target data, the target data being one or more items of the data selected based on the comparison result.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of a collection condition input screen;

FIG. 6 is a diagram illustrating an example of a configuration of a document vector storage unit;

FIG. 8 is a diagram illustrating an example of a configuration of a document information storage unit;

FIG. 9 is a diagram illustrating an example of a result of sorting document information;

FIG. 12 is a diagram illustrating an example of a configuration of a document related storage unit;

FIG. 13 is a diagram illustrating an example of a document details screen;

FIG. 14 is a diagram illustrating an example of a document related diagram;

FIG. 16 is a diagram illustrating an example of a configuration of a workspace storage unit;

FIG. 24 is a diagram illustrating an example of a configuration of an information collection system according to a second embodiment;

FIG. 26 is a diagram illustrating an example of a configuration of a meeting information storage unit; and FIG. 27 is a diagram illustrating an example of information additionally collected regarding document information related to a meeting.

Figure 1:
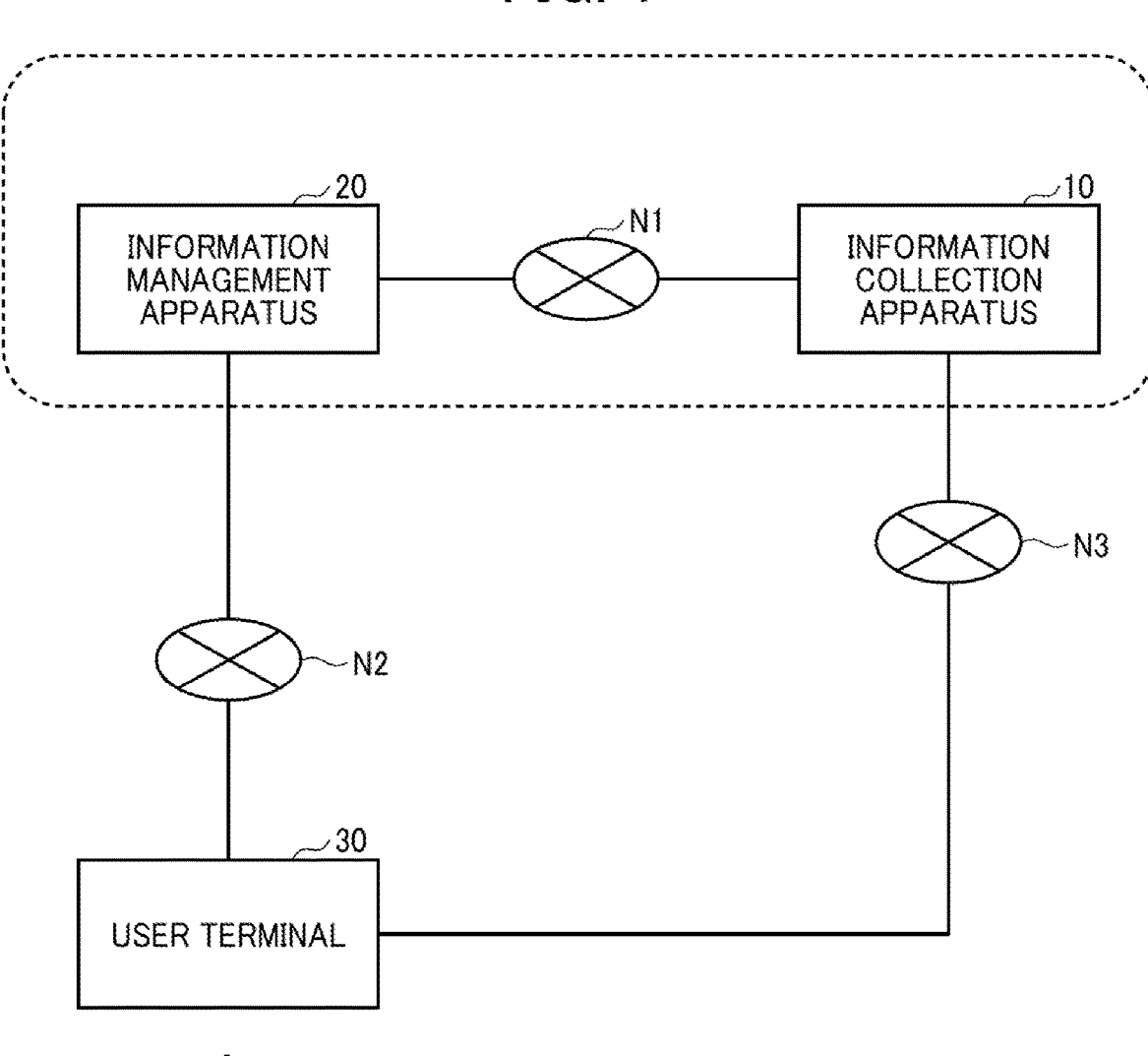
FIG. 1 is a diagram illustrating an example of a configuration of an information collection system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of embodiments of the present disclosure with reference to the drawings. FIG. 1 is a diagram illustrating an example of a configuration of an information collection system according to a first embodiment. As illustrated in FIG. 1, the information collection system includes an information management apparatus 20, an information collection apparatus 10, one or more user terminals 30, and the like. The information collection apparatus 10 is connected to the information management apparatus 20 through a network N1. The user terminal 30 connects to the information management apparatus 20 through a network N2, and connects to the information collection apparatus 10 through a network N3.

The user terminal 30 is a terminal used by a user to collect certain information (access to certain information). For example, a personal computer (PC), a tablet terminal, a smartphone, or the like may be used as the user terminal 30. In the present embodiment, document information, expert information, and workspace are examples of types of information that the user collects.

The document information refers to electronic data in which documents are recorded (hereinafter referred to as "document data") including attribute information or bibliographic information, and the like.

A document is a collection of one or more words or sentences (and includes alphanumeric characters and other languages). The document data may be in any format as long as a sentence is expressed. For example, the document data is data expressing a document in a text format, or data in a format specialized for a specific application. In another example, the document data expresses a word or sentence or a concept corresponding to a word or sentence using an image, audio, video, or the like. Accordingly, the document data may be image data, audio data, or video data. Furthermore, a storage format of document data is not limited to any particular format. For example, the document data is stored and saved in a file, as a record in a database, or in other formats.

The expert information is information about a person (hereinafter referred to as an "expert") who is presumed to know certain information (or is familiar with the certain information).

The workspace is information indicating results of information collection (search results) performed in the past using an information collection system, or information in which the results of information collection have been edited. In the present embodiment, the information that the user desires to collect is referred to as "knowledge."

When the document information related to certain knowledge is collected, a user is able to obtain desired knowledge by, for example, viewing document data related to the document information.

When expert information related to experts who are familiar with the certain knowledge is collected, the user is able to obtain desired knowledge from the expert by accessing the expert, for example.

When a workspace related to the certain knowledge (results of collection of information by other users in the past or edited data thereof, and the like) is collected, the user is able to obtain desired knowledge based on the workspace.

The information management apparatus 20 is one or more computers to store information to be collected (document information, expert information, and workspace).

The information collection apparatus 10 is one or more computers to collect information matching an information collection condition from the information management apparatus 20 based on the information collection condition input by the user.

In one example, the information management apparatus 20 and the information collection apparatus 10 are implemented using the same computer. In this case, the network N1 corresponds to a signal line such as a bus inside the computer that includes the information management apparatus 20 and the information collection apparatus 10. Alternatively, each user terminal 30 may also serve as the information collection apparatus 10. In this case, the network N3 corresponds to a signal line such as a bus inside the user terminal 30.

A scene (situation) in which the information collection system is used is not limited to a certain format. For example, the information collection system is used inside a company. In other words, each employee of a company (including private enterprises, government agencies, various organizations, unions, and the like, and also includes temporary employees, part-time workers, and the like, in addition to employees) may be a user. In the present embodiment, an employee of the company is described as a user, but the present disclosure is not limited to this example, and the present embodiment applies in the case the information collection system is used by general users.

In this case, the information management apparatus 20 is a group of computers that manage various information within the company.

For example, the information management apparatus 20 manages the document information related to various document data created within a company, information related to an organizational structure of the company, information related to each employee within the company, and workspaces and the like as a result of information collection conducted within the company. In another example, the information management apparatus 20 also manages electronic business communications (email, chat, and the like) between employees within a company. In this case, the network N2 corresponds to, for example, a wide area network (WAN) or a local area network (LAN) inside the company.

The information collection apparatus 10 may be installed inside a company, or may be installed outside the company (in a cloud environment, a data center, and the like) connected to a network inside the company through the internet). In the case the information collection apparatus 10 is provided inside the company, the network N1 and the network N3 correspond to, for example, the WAN or the LAN inside the company. In the case the information collection apparatus 10 is installed outside the company, the network N1 and the network N3 correspond to, for example, the internet. The information collection apparatus 10 may collect information desired by the user from information made public outside the company.

Figure 2:
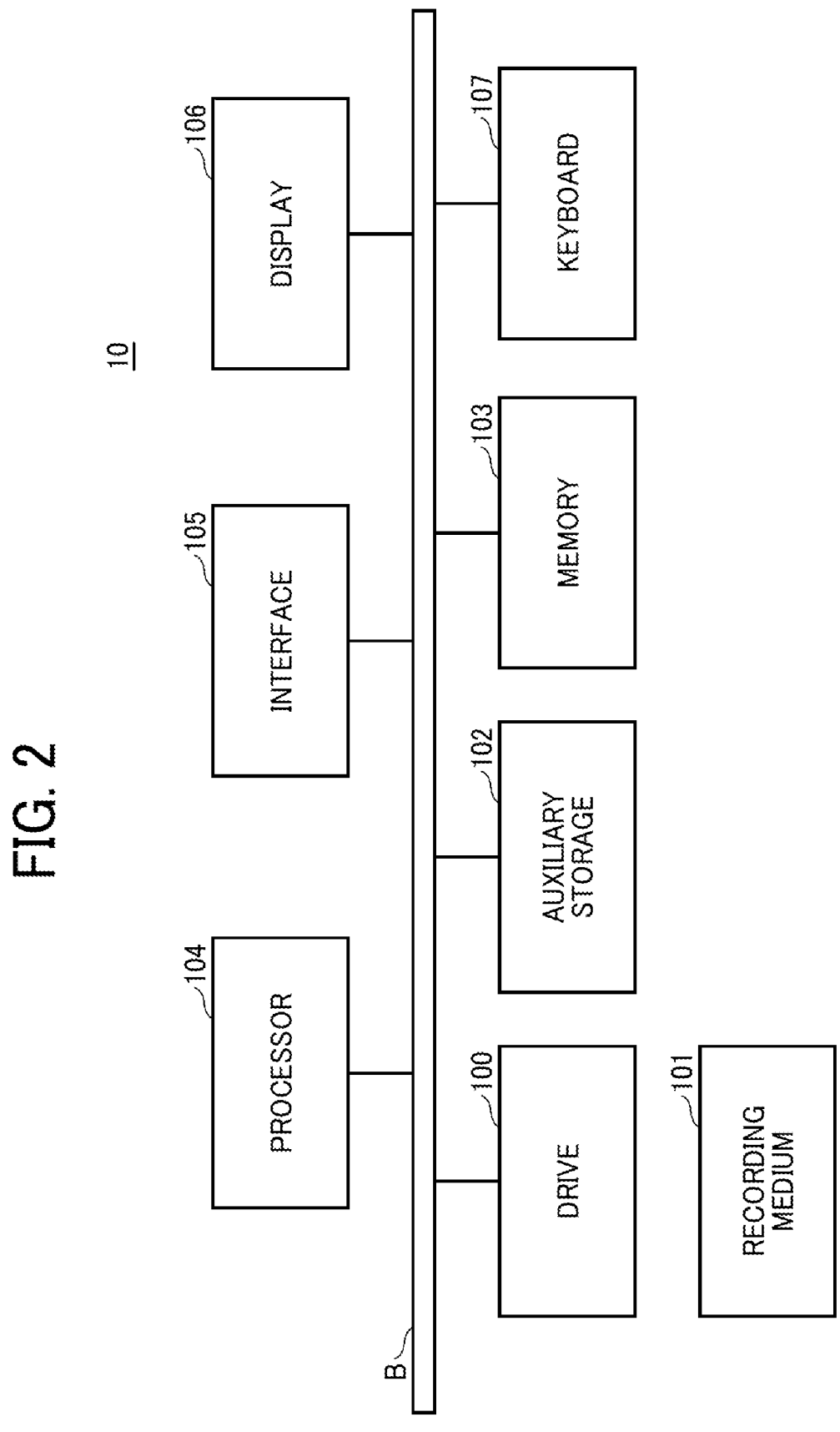
FIG. 2 is a diagram illustrating an example of a hardware configuration of an information collection apparatus according to the first embodiment.

FIG. 2 is a diagram illustrating an example of a hardware configuration of the information collection apparatus 10 according to the first embodiment. The information collection apparatus 10 in FIG. 2 includes a drive 100, an auxiliary storage 102, a memory 103, a processor 104, an interface 105, a display 106, a keyboard 107, and the like, which are connected to each other through a bus B.

A program for implementing processing in the information collection apparatus 10 is provided by a recording medium 101 such as a compact disk-read only memory (CD-ROM). In response to a setting of the recording medium 101 storing the program in the drive 100, the program is installed from the recording medium 101 to the auxiliary storage 102 through the drive 100. Alternatively, the program is not installed from the recording medium 101 but the program is downloaded from another computer through the network. The auxiliary storage 102 stores the installed program and also stores files and data.

The memory 103 reads and stores the program from the auxiliary storage 102 in response to an instruction to start the program. The processor 104 is a central processing unit (CPU), a graphics processing unit (GPU), or the CPU and the GPU, and executes functions related to the information collection apparatus 10 according to the program stored in the memory 103. The interface 105 is an interface to connect to a network. The display 106 is an example of a display device that displays a screen and the like. The keyboard 107 is an example of an input device. Other examples of the input device are a microphone and a touch panel.

The information management apparatus 20 and the user terminal 30 may also have the same hardware configuration as in FIG. 2.

Figure 3:
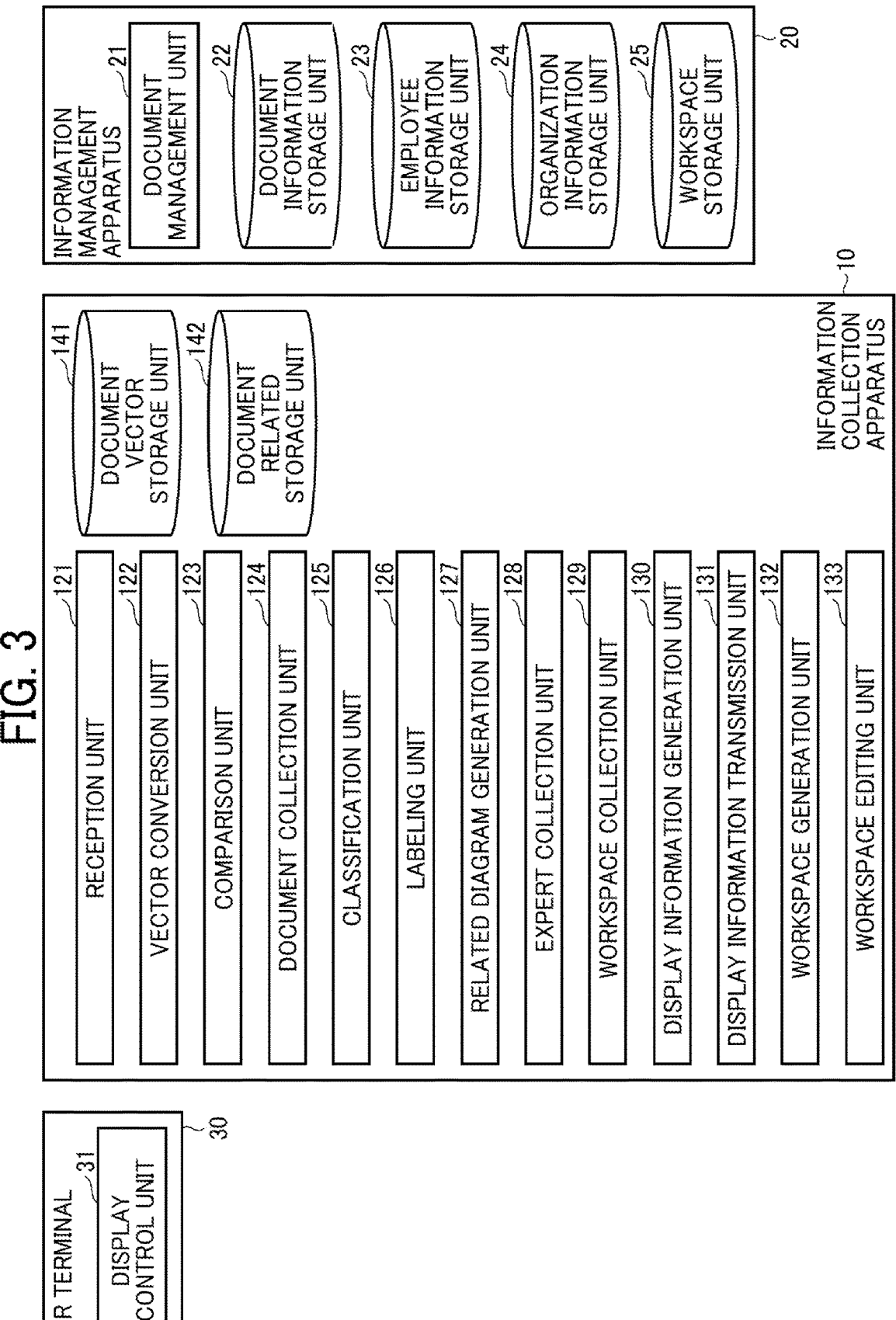
FIG. 3 is a diagram illustrating an example of a functional configuration of an information collection system according to the first embodiment.

FIG. 3 is a diagram illustrating an example of a functional configuration of the information collection system according to the first embodiment. In FIG. 3, the user terminal 30 includes a display control unit 31. The display control unit 31 is implemented by one or more programs (for example, a web browser program) installed on the user terminal 30 that cause the processor of the user terminal 30 to execute the process.

The display control unit 31 displays a screen on a display based on display information transmitted from the information collection apparatus 10, and transmits a request to the information collection apparatus 10 in response to an input to the screen.

The information management apparatus 20 includes a document management unit 21. The document management unit 21 is implemented by one or more programs installed in the information management apparatus 20 causing the processor of the information management apparatus 20 to execute processes. The information management apparatus 20 also includes a document information storage unit 22, an employee information storage unit 23, an organization information storage unit 24, a workspace storage unit 25, and the like. Each of these storage units is implemented by, for example, an auxiliary storage of the information management apparatus 20 or a storage device connectable to the information management apparatus 20 through a network.

The document management unit 21 registers, updates, or deletes a plurality of items of document information stored in the document information storage unit 22.

The employee information storage unit 23 stores attribute information and the like (hereinafter referred to as "employee information") of each employee of a company that uses the information management apparatus 20 (hereinafter referred to as a "company X").

The organization information storage unit 24 stores information describing the organizational structure of company X (hereinafter referred to as "organization information"). For example, the organization information is information describing the organization structure in a form of graph in which each organization is a node and hierarchical relationships (parent-child relationships) between organizations are branches.

The workspace storage unit 25 stores information regarding the workspace. For example, as described above, the workspace receives and stores the collection result of certain information (for example, document information) or the user's edits to the workspace, and the information in which the contents of the edits are reflected (stored) in the workspace storage unit 25 (hereinafter referred to as "collection result" or "search result"). The information regarding a certain workspace is, for example, information that associates the workspace with the document information included in the collection result to which the workspace corresponds.

The information collection apparatus 10 includes a reception unit 121, a vector conversion unit 122, a comparison unit 123, a document collection unit 124, a classification unit 125, a labeling unit 126, a related diagram generation unit 127, an expert collection unit 128, a workspace collection unit 129, a display information generation unit 130, a display information transmission unit 131, a workspace generation unit 132, a workspace editing unit 133, and the like. Each of these units is implemented by one or more programs installed in the information collection apparatus 10 causing the processor 104 to execute the process. The information collection apparatus 10 also includes a document vector storage unit 141, a document related storage unit 142, and the like. Each of these storage units is implemented by using, for example, the auxiliary storage 102 or a storage device connected to the information collection apparatus 10 through the network.

The reception unit 121 receives an information collection request to collect information desired by the user from the user terminal 30. The information collection request includes a condition regarding information collection (collection condition). The collection condition includes a type of information to be collected (hereinafter referred to as "information type", or more specifically, "information type of a collection target") and a character string describing the information to be collected in natural language (hereinafter referred to as "query").

In the present embodiment, options of the information type are, for example, "document." "expert." and "workspace." The "document" is the information type corresponding to the document information. The "expert" is the information type corresponding to the expert information. The "workspace" is the information type corresponding to the workspace.

The query is, for example, a set of one or more words. The query may be a list of one or more words, or may have a form of one or more sentences.

The vector conversion unit 122 analyzes the query included in the collection condition and the document data related to each document information stored in the document information storage unit 22, and converts the query or document data into vector format data (hereinafter simply referred to as "vector"). The vector is also called a distributed representation or an embedded representation, and is an expression according to a meaning contained in the data to be converted (query, document data, and the like). For example, the vector conversion unit 122 generates a vector using natural language processing such as Bidirectional Encoder Representations from Transformers (BERT). The BERT model may be switched using user attributes. The vector conversion unit 122 generates the vector for each document data in advance and stores the vector in the document vector storage unit 141. Hereinafter, the vector based on the query is referred to as a "query vector." and the vector based on the document data is referred to as a "document vector."

The comparison unit 123 compares the query vector with each document vector and evaluates the similarity of each document vector with the query vector. In the present embodiment, the index for evaluating degree of similarity is referred to as "similarity."

The comparison unit 123 also calculates the similarity between document vectors for all pairs of two document vectors, and records the similarity for each pair of document vectors in the document related storage unit 142.

The document collection unit 124 extracts (collects) document information (document data) related to the query based on the similarity for each document vector, which is the comparison result between the query vector and the document vector by the comparison unit 123.

A "comparison" process performed by the comparison unit 123 may be referred to as "search." and the document collection unit 124 may use the above-mentioned process as a search result by the comparison unit 123. Further, in that case, the collection of information may be referred to as an information search or simply a search.

The classification unit 125 classifies the document information (document data) extracted by the document collection unit 124 based on each document vector. For example, clustering is used for classification. A group of document data after classification is called a "class."

The labeling unit 126 assigns a label to each class. The labeling unit 126 also applies the label to each document data in advance based on the content of each document data.

The result of labeling each document data is recorded in the document information storage unit 22. In the present embodiment, the label is a character string (for example, a "word") that (simply) indicates characteristic of an object to which the label is assigned.

The related diagram generation unit 127 generates a related diagram, which is a graphic representing relationship between the document data, classes, and queries, based on the classification result by the classification unit 125 and the labeling result by the labeling unit 126. The related diagram generation unit 127 also generates a related diagram illustrating the relationship between certain document data and other document data based on each document vector.

The expert collection unit 128 extracts (collects) a person (an employee, an external expert, and the like) related to the document data related to the query as experts based on the comparison result by the comparison unit 123. The person related to certain document data is, for example, a person who created or updated the document data.

The workspace collection unit 129 extracts (collects) the workspace related to the document data related to the query based on the comparison result by the comparison unit 123. The workspace related to the certain document data refers to, for example, a workspace corresponding to the collection result including document information related to the document data or edited data thereof.

The display information generation unit 130 generates display information to be displayed on the user terminal 30. For example, the display information generation unit 130 generates display information regarding processing result by the document collection unit 124, the expert collection unit 128, and the workspace collection unit 129, or generates display information for displaying the related diagram generated by the related diagram generation unit 127. For example, in the case the display control unit 31 of the user terminal 30 is implemented by the web browser, a web page is an example of the display information. However, the display information may be generated in other formats.

The display information transmission unit 131 transmits the display information generated by the display information generation unit 130 to the user terminal 30.

The workspace generation unit 132 generates the workspace related to the collection result of document information in response to an instruction from the user regarding the collection result of document information, and stores the workspace in the workspace storage unit 25.

The workspace editing unit 133 receives user edits to the workspace, and reflects the edited content in the workspace storage unit 25.

The functional configuration (arrangement relationship of each function) illustrated in FIG. 3 is an example. The device where each unit is placed may be changed to the user terminal 30, the information collection apparatus 10, or the information management apparatus 20 as appropriate.

Figure 4:
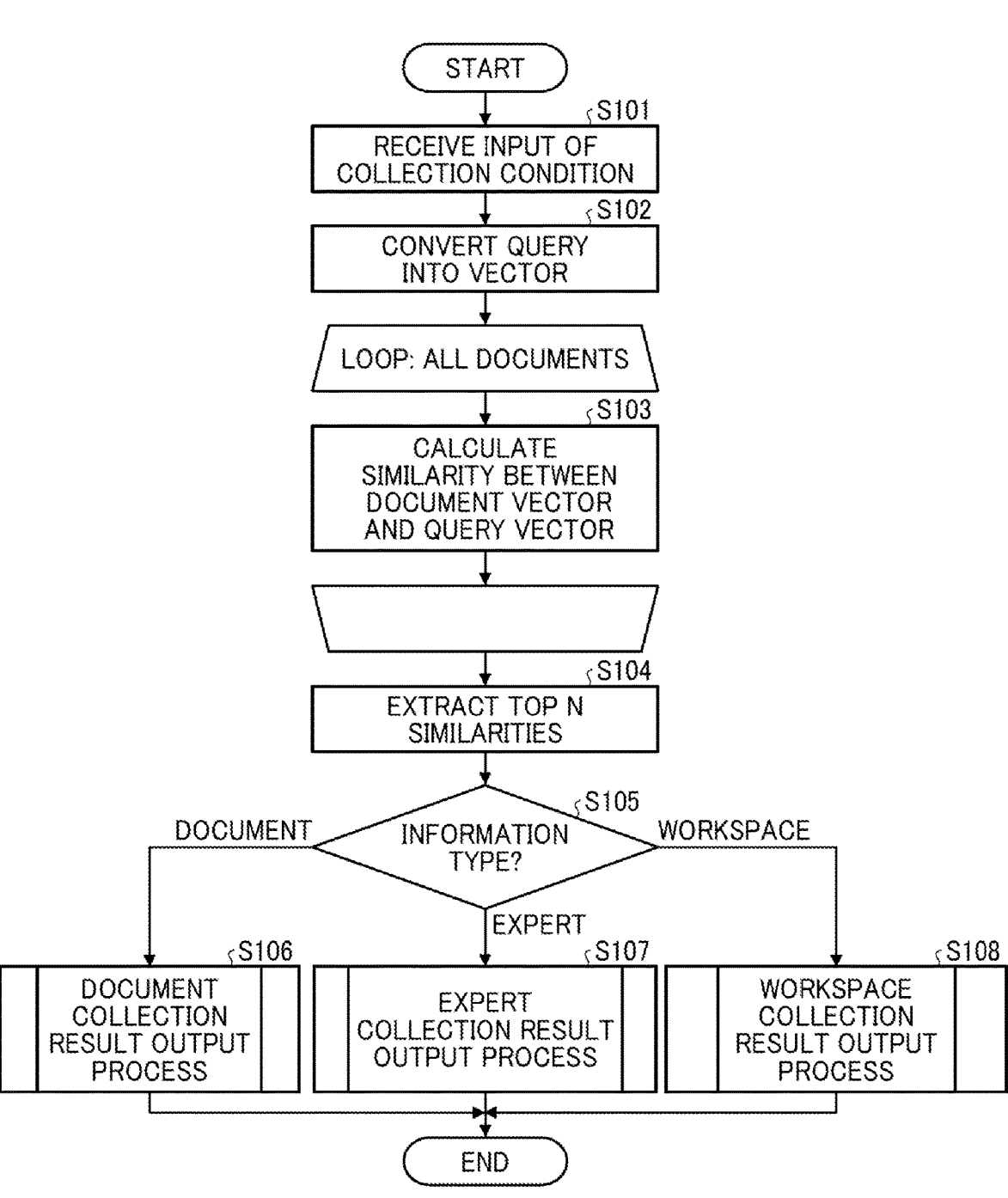
FIG. 4 is a flowchart illustrating an example of an information collection process.

A process executed by the information processing system is described below. FIG. 4 is a flowchart illustrating an example of an information collection process.

In step S101, the display control unit 31 of the user terminal 30 receives input of collection condition from the user through a collection condition input screen displayed on the display 106 of the user terminal 30.

FIG. 5 is a diagram illustrating an example of the collection condition input screen. As illustrated in FIG. 5, the collection condition input screen 510 includes an information type selection field 511, a query input field 512, an execution button 513, and the like. The information type selection field 511 is a field for receiving selection of the information type. For example, the information type selection field 511 is a list box containing options corresponding to the "document," the "expert," and the "workspace," which are the options of the information type in the present embodiment. In the example of FIG. 5, "document" is selected.

The query input field 512 is a field for receiving input of the query. The query may be input using the keyboard 107 or the like of the user terminal 30 (including direct input using a touch panel), or may be input by voice through a microphone of the user terminal 30.

The execution button 513 is a button for receiving an information collection execution instruction (search execution).

The collection condition input screen 510 may be displayed on the user terminal 30, for example, in response to a user logging into the information collection apparatus 10. Hereinafter, a user who inputs the collection condition (search condition) is referred to as a "login user."

In response to a pressing of the execution button 513 by the login user after the information type is selected and the query is input, the display control unit 31 sends an information collection request that includes the selected information type and the input query as the information collection condition, to the information collection apparatus 10.

In response to receiving the information collection request by the reception unit 121 of the information collection apparatus 10, the vector conversion unit 122 converts the query (hereinafter referred to as a "target query") included in the information collection request (hereinafter referred to as a "target collection request") into a query vector in step S102.

In step S103, the comparison unit 123 compares the query vector and the document vector corresponding to the document data for each document data related to the document information managed by the information management apparatus 20, and calculates the similarity between the query vector and the document vector. The document vector corresponding to each document data managed by the information management apparatus 20 are stored in the document vector storage unit 141.

FIG. 6 is a diagram illustrating an example of a configuration of the document vector storage unit 141. As illustrated in FIG. 6, the document vector storage unit 141 stores a document ID, a document name and a document vector for each document data. The document identification information (ID) is identification information of the document information related to the document data, and associates the document information in the information management apparatus 20 with the document vector in the document vector storage unit 141. The document name is a name or title of the document data. For example, in the case the document data is saved in a file format, a file name may be used as the document name. The document vector, like the query vector, is a vector representation (for example, a distributed representation or an embedded representation) according to meaning of the contents of the document data.

The similarity between the query vector and the document vector is calculated using the angle (cosine similarity) and distance between the query vector and the document vector, similar to the calculation of the similarity between general vectors. For example, in the case the cosine similarity is to be used, the cosine similarity between vector a and vector b is calculated based on the following formula.

$$\cos(a, b) = \frac{a \cdot b}{\|a\|\|b\|} \qquad \text{Equation (1)}$$

Once the similarity with the query vector is calculated for all document vectors, the comparison unit 123 extracts (selects) the document vectors with the top N similarities in step S104. In other words, N document vectors are extracted in descending order of similarity to the query vector. Note that the value of N is an integer of 1 or more and is set in advance. Alternatively, a threshold may be set for the similarity, and the number of document vectors whose similarity is equal to or greater than the threshold may be N.

In step S105, the information collection apparatus 10 branches the process depending on the information type of the target collection condition (hereinafter referred to as a "target information type"). For the target information type "document", the information collection apparatus 10 executes a document collection result (document search result) output process in step S106.

For the target information type "expert," the information collection apparatus 10 executes an expert collection result (expert search result) output process in step S107. For the target information type "workspace," the information collection apparatus 10 executes a workspace collection result (workspace search result) output process in step S108.

Figure 7:
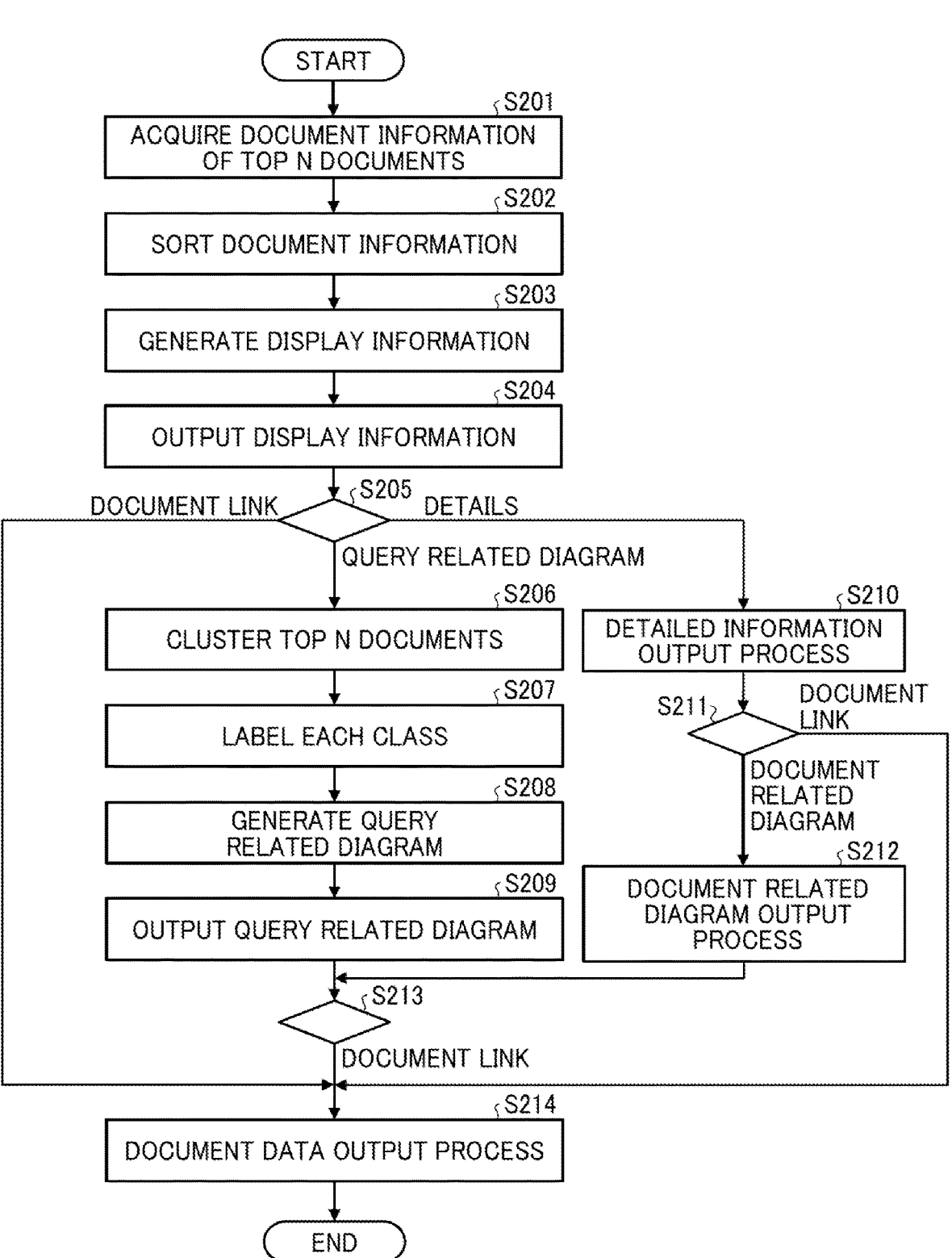
FIG. 7 is a flowchart illustrating an example of a document collection result output process.

Details of step S106 are described in the following. FIG. 7 is a flowchart illustrating an example of the document collection result output process.

In step S201, the document collection unit 124 acquires (extracts) the document information of document data related to the top N items from the document information storage unit 22 based on the document IDs of the document vectors with the top N similarities.

FIG. 8 is a diagram illustrating an example of a configuration of the document information storage unit 22. As illustrated in FIG. 8, the document information storage unit 22 stores one or more records including the document ID, document name, creator, update history, file path, summary, access control information, label list, and the like. One record corresponds to one item of document information.

The document ID and document name are as described above. The document ID and document name for the same document data are the same in the document information storage unit 22 and the document vector storage unit 141.

The creator is identification information of the creator of the document data. The update history is information that includes the date of update and identification information of an updater for each update of the document data. In the present embodiment, the identification information of the creator or updater of document data is assumed as an employee ID at company X. The file path is a path name of a file that stores the document data. The summary is a summary of the contents included in the document data (for example, a summary sentence). The access control information is information for restricting access to the document information to a particular range of users. In other words, the access control information is information indicating whether each user has access authority. For example, the access control information may include information indicating a user or group having viewing authority and information indicating a user or group having writing authority. The group is a collection of one or more users. The label list is a list of labels (hereinafter referred to as a "document label") assigned to the document data by the labeling unit 126. Words that are determined to have relatively high term frequency-inverse document frequency (TF-IDF), among the words included in the document data may be used as the document label.

In step S201, document information to which the login user has the access authority is acquired from among the top N document information items. (As described below, information for displaying that there is no access authority may be acquired for the document information to which the user does not have the access authority.)

In step S202, the document collection unit 124 sorts (arranges) the acquired document information in descending order of similarity.

FIG. 9 is a diagram illustrating an example of a result of sorting the document information. FIG. 9 illustrates an example in which document names and similarities are arranged in descending order of similarity.

In step S203, the display information generation unit 130 generates display information to display the sorted result as the document information collection result (search result).

The display information generation unit 130 generates the display information based on the creator, update history, file path, summary, label list, and the like of the document information that the login user has authority to view from among the top N document data.

In step S204, the display information transmission unit 131 and the display control unit 31 of the user terminal 30 execute display information output process. Specifically, the display information transmission unit 131 transmits the display information to the user terminal 30. The display control unit 31 of the user terminal 30 displays on the display 106, a search result screen as a result of document collection based on the display information.

Figure 10:
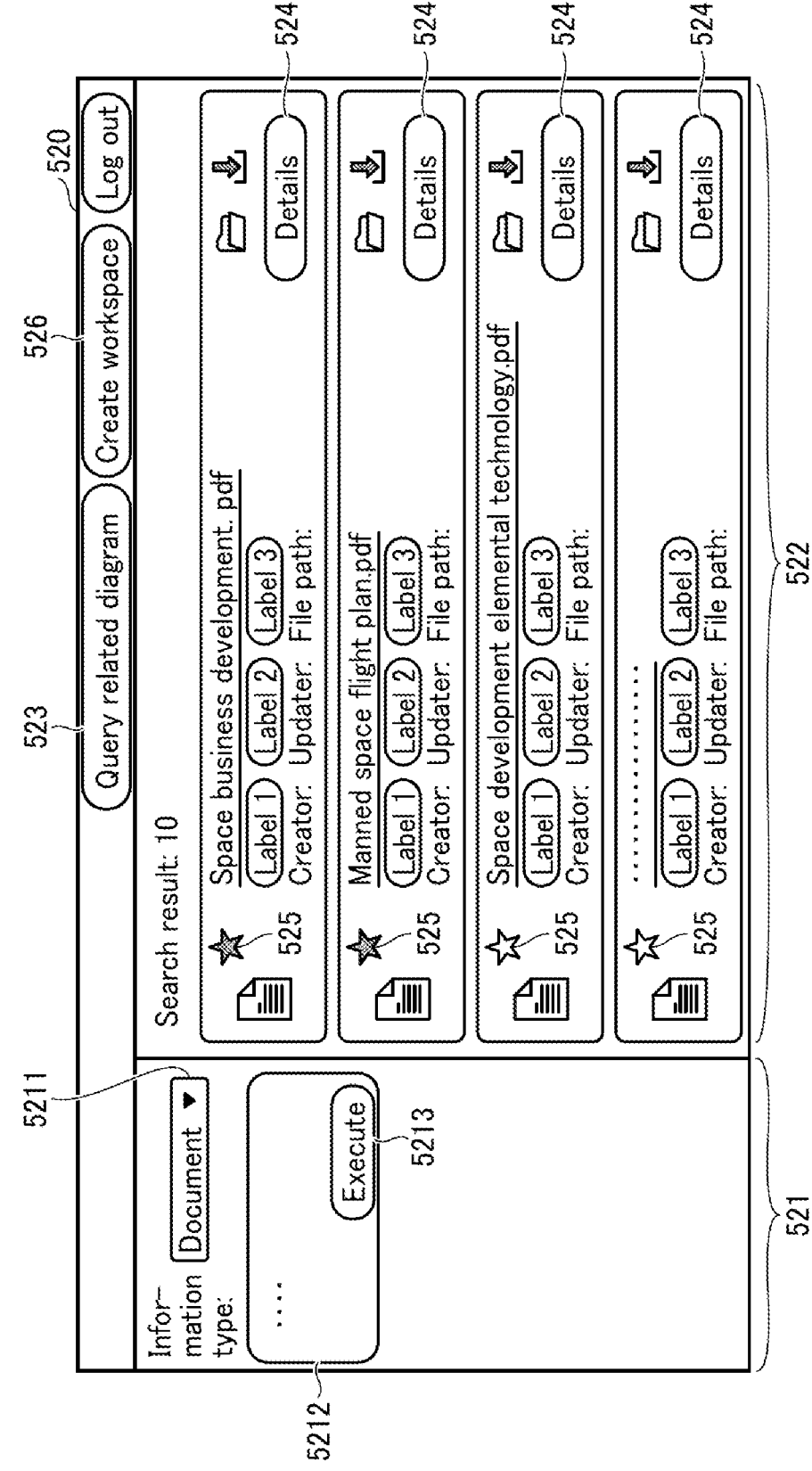
FIG. 10 is a diagram illustrating an example of a search result screen.

FIG. 10 is a diagram illustrating an example of the search result screen. As illustrated in FIG. 10, the search result screen 520 includes an information collection condition display field 521 and a search result display field 522.

The information collection condition display field 521 is a field to display the target collection condition, and includes an information type display field 5211 and a query display field 5212. The information type display field 5211 is a field to display the target information type. The query display field 5212 is a field to display the target query. In one example, the information type display field 5211 and the query display field 5212 are operable. In this case, the information type or part of the query is changed through the information type display field 5211 and the query display field 5212 and the execution button 5213 is pressed to re-execute steps S101 and subsequent steps in FIG. 4.

The search result display field 522 is a field to display the creator, updater, file path, summary, label list, and the like for the document information of each of the top N documents. The updater may be, for example, an updater related to a last update in the update history.

By referring to the search result screen 520, the login user checks a list of document information collected according to the target collection condition.

The search result screen 520 also includes a query related diagram button 523. In response to a pressing of the query related diagram button 523, the user terminal 30 transmits a request corresponding to the query related diagram button 523 to the information collection apparatus 10. In response to receiving the request ("QUERY RELATED DIAGRAM" in step S205 of FIG. 7), the classification unit 125 of the information collection apparatus 10 classifies the document vectors having the top N similarities into a plurality of classes by clustering in step S206. The clustering may be performed using, for example, a k-means method, or may be performed using other known methods.

In step S207, the labeling unit 126 assigns the label to each class. For example, in a set of document data belonging to a certain class, the labeling unit 126 assigns a label including one or more words that are determined to be relatively significant using TF-IDF or the like. Alternatively, the labeling unit 126 selects one or more document labels having a relatively high appearance frequency from a list of document labels of each document data belonging to the class as the label of the class.

In step S208, the related diagram generation unit 127 generates a related diagram (hereinafter referred to as a "query related diagram") illustrating the relationship between the target query and the top N items of document information. In step S209, the related diagram generation unit 127 and the user terminal 30 execute an output process of the query related diagram. Specifically, the related diagram generation unit 127 transmits display information of the query related diagram to the user terminal 30. The display control unit 31 of the user terminal 30 displays on the display 106, the query related diagram based on the display information.

Figure 11:
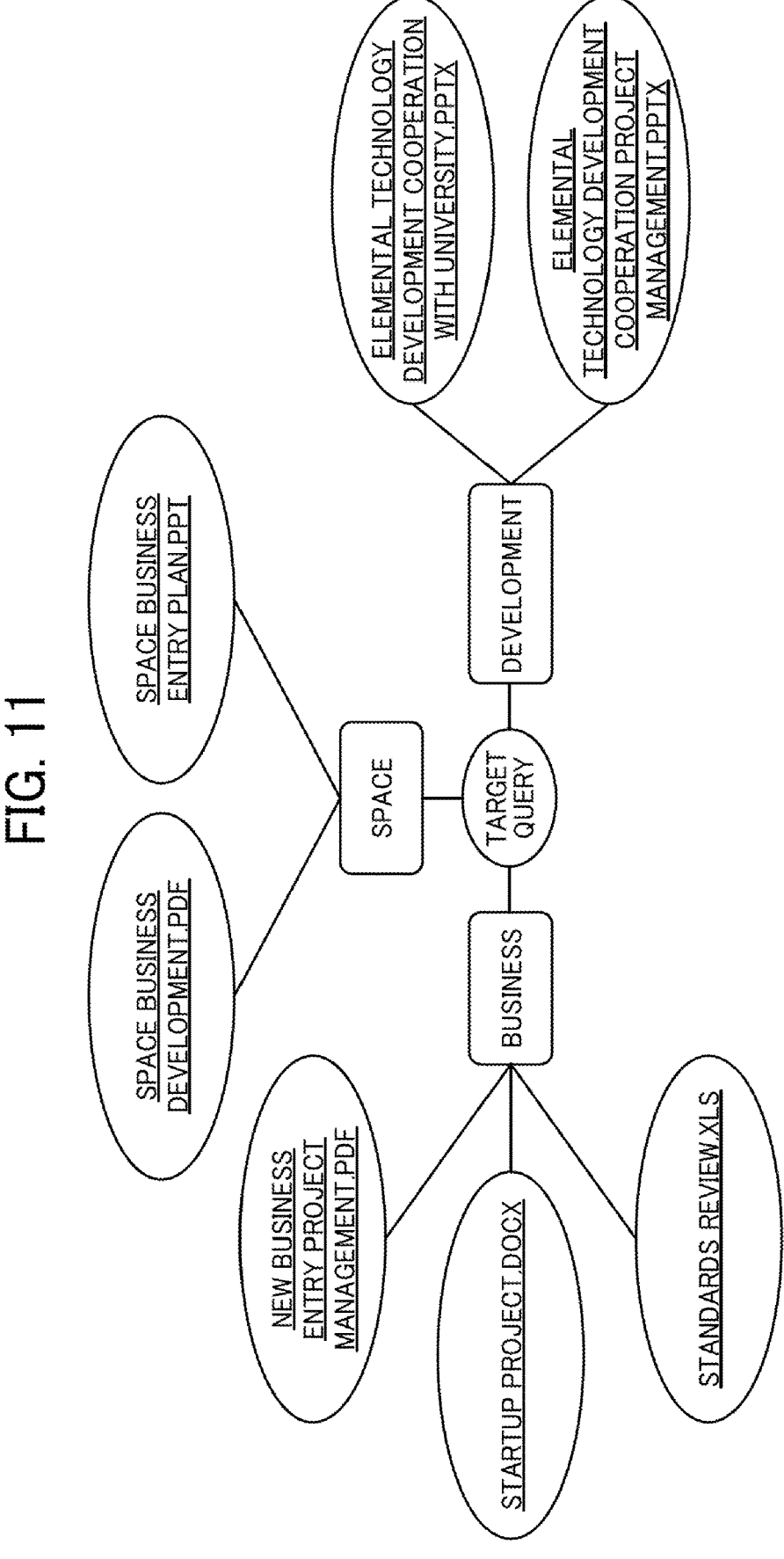
FIG. 11 is a diagram illustrating an example of a query relation diagram.

FIG. 11 is a diagram illustrating an example of the query related diagram. As illustrated in FIG. 11, the query related diagram is a graph-like figure in which nodes are the target query, each class, and N items of document information.

The target query and each class are connected by a branch, and each item of document information is connected to the class to which the document belongs by a branch. In FIG. 11, a rectangle with rounded corners that is directly connected to the target query is a node corresponding to a class. A character string inside the node is the label of the class corresponding to the node.

An elliptical node connected to the rectangle with rounded corners is a node corresponding to the document information classified into the class corresponding to the rectangle. A character string inside the node is the document name of the document information corresponding to the node. By referring to the query related diagram, the user is able to get a bird's-eye view of the relationship between the collected document information and the target query.

Alternatively, in response to a pressing of the details button 524 corresponding to any document information on the search result screen 520 (FIG. 10), the display control unit 31 of the user terminal 30 transmits a request corresponding to the details button 524 to the information collection apparatus 10. The request includes, for example, the document ID of the document information.

In response to receiving the request ("DETAILS" in step S205), the display information generation unit 130 of the information collection apparatus 10 executes a detailed information output process for the document information (hereinafter referred to as a "target document information") related to the document ID (hereinafter referred to as a "target document ID") included in the request in step S210. Specifically, the display information generation unit 130 refers to the document related storage unit 142, and specifies the document ID of the document information (hereinafter referred to as "related document information") related to the document data having the top M similarity with the document data related to the target document information.

Figure 12:
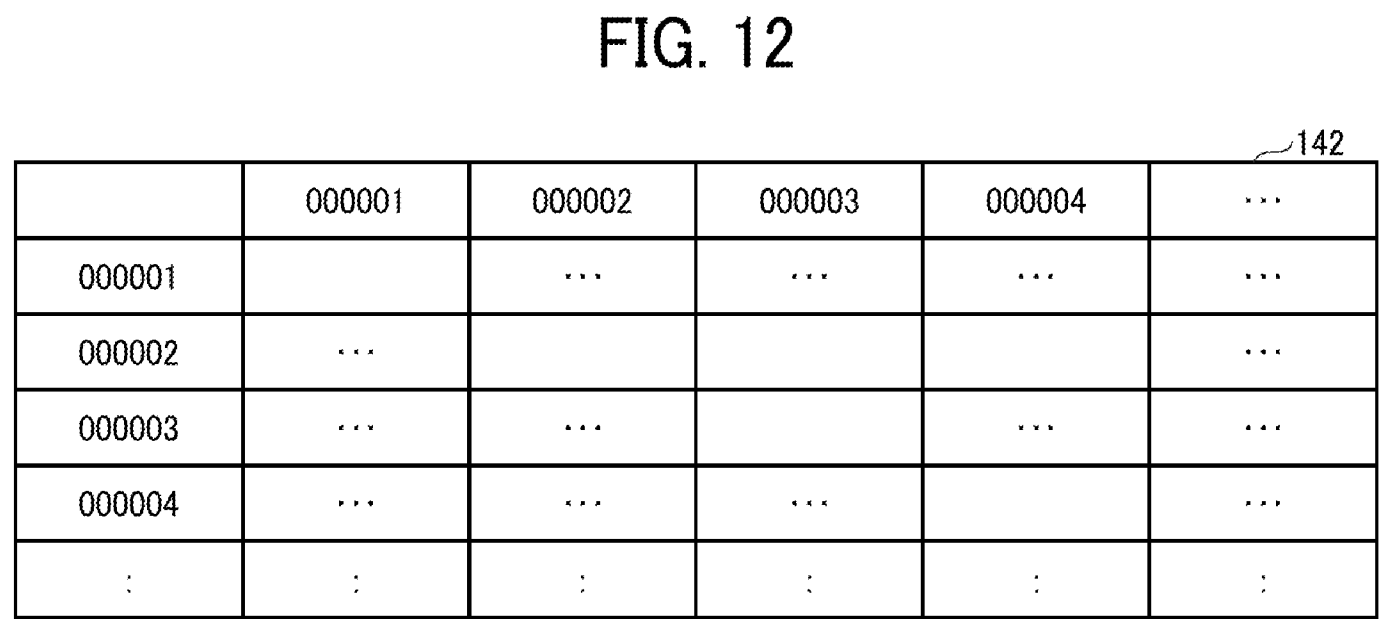

FIG. 12 is a diagram illustrating an example of a configuration of a document related storage unit 142. As illustrated in FIG. 12, the document related storage unit 142 is in a matrix form in which document IDs of all document data are arranged in rows and columns. All document data refers to all document data whose document information is stored in the document information storage unit 22. The value of an element in a certain row and a certain column is the similarity between the document vector of the document data related to the document ID in the corresponding row and the document vector related to the document ID in the corresponding column.

The similarity between the document data stored in the document related storage unit 142 is calculated in advance by the comparison unit 123, for example. The comparison unit 123 acquires the document vector of each document data by referring to the document vector storage unit 141 (FIG. 6), and calculates the similarity between the document data using the document vector.

For example, the display information generation unit 130 identifies the document IDs of the top M items of related document information by sorting the similarity in the row of target document IDs in descending order.

The display information generation unit 130 acquires target document information and the related document information from the document information storage unit 22 (FIG. 8) of the information management apparatus 20 based on the respective document IDs, and generates the display information of the document details screen based on the acquired document information. The display information transmission unit 131 transmits the display information to the user terminal 30, and the display control unit 31 of the user terminal 30 displays on the display 106 the document details screen based on the display information.

FIG. 13 is a diagram illustrating an example of the document details screen. As illustrated in FIG. 13, the document details screen 530 includes a target document display field 531, a related document display field 532, and the like.

The target document display field 531 is a field to display the target document information. The target document display field 531 displays the update history and summary of the target document information in addition to the items displayed on the search result screen 520 (FIG. 10).

The related document display field 532 is a field to display the related document information. The related document display field 532 includes a details button 5321 for each related document information. In response to a pressing of the details button 5321 corresponding to any related document information, a detailed information output process similar to step S210 is executed using the related document information as target document information. As a result, the user is able to recursively collect the document information related to the target query.

The document details screen 530 also includes a document related diagram button 533. In response to a pressing of the document related diagram button 533, the user terminal 30 transmits a request corresponding to the document related diagram button 533 to the information collection apparatus 10. In response to receiving the request ("DOCUMENT RELATED DIAGRAM" in step S211 of FIG. 7), the information collection apparatus 10 executes the document related diagram output process in step S212. In the document related diagram output process, the target query is replaced with the target document data, the top N items of document information is replaced with the M items of related document information, and the same process as steps S206 to S209 is executed.

Specifically, the classification unit 125 classifies the document vectors related to the M items of related document information into a plurality of classes by clustering. Subsequently, the labeling unit 126 assigns the label to each class.

Next, the related diagram generation unit 127 generates the related diagram (hereinafter referred to as the "document related diagram") that illustrates the relationship between the target document information and the M items of related document information, and transmits the display information of the document related diagram to the user terminal 30. The display control unit 31 of the user terminal 30 displays on the display 106, the document related diagram based on the display information.

Figure 14:
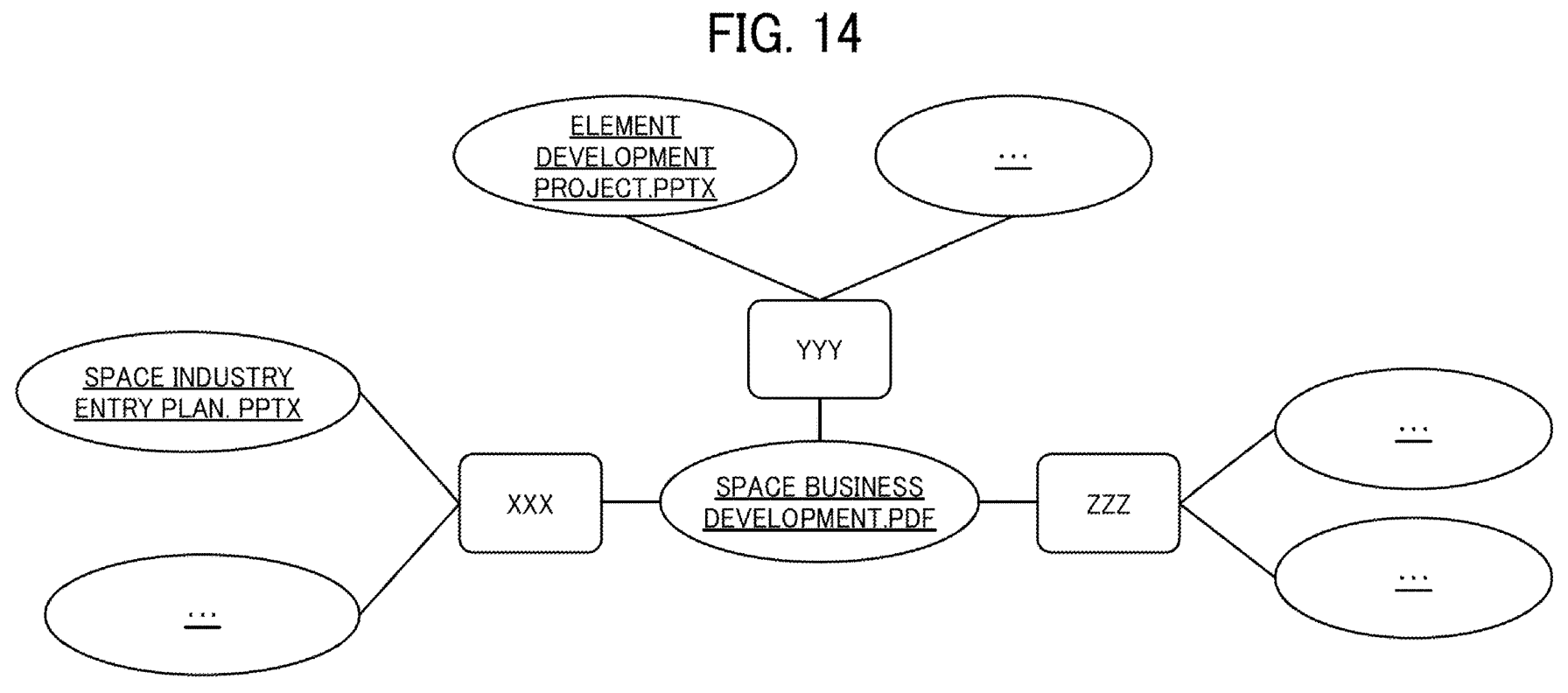

FIG. 14 is a diagram illustrating an example of the document related diagram. As illustrated in FIG. 14, the document related diagram is in the graph format in which nodes are target document information, each class, and M items of related document information. The target document information and each class are connected by a branch, and each related document information is connected to a class to which the related document information belongs by a branch. In FIG. 14, a rectangle with rounded corners that is directly connected to the target document information is a node corresponding to the class. A character string inside the node is the label of the class corresponding to the node.

By visualizing the relationship structure between the documents as illustrated in FIG. 11 or FIG. 14, the user is able to intuitively grasp the relationship between the information to collect and the document information.

An elliptical node connected to the rectangle with rounded corners is a node corresponding to the related document information classified into the class corresponding to the rectangle. A character string inside the node is the document name of the related document information corresponding to the node. By referring to the document related diagram, the user is able to grasp the relationship between the target document information and the related document information from a bird's-eye view.

Alternatively, the user terminal 30, the information collection apparatus 10, and the information management apparatus 20 execute the document data output process in step S214, in response to a selection of a link to one of the document names on the search result screen 520 (FIG. 10) ("DOCUMENT LINK" in step S205 of FIG. 7), a link to one of the document names on the document details screen 530 (FIG. 13) ("DOCUMENT LINK" in step S211), or a link to one of the document names in the query related diagram (FIG. 11) or the document related diagram (FIG. 14) ("DOCUMENT LINK" in step S213). Specifically, the display control unit 31 of the user terminal 30 transmits the document ID (hereinafter referred to as "target document ID") of the document information whose link for the document name has been selected to the information collection apparatus 10. The display information transmission unit 131 of the information collection apparatus 10 transmits to the user terminal 30 a redirect command including a uniform resource locator (URL) and the like for requesting the information management apparatus 20 to refer to the document data related to the target document ID. In response to the display control unit 31 of the user terminal 30 accessing the URL in accordance with the redirect command, the document management unit 21 of the information management apparatus 20 transmits the document data related to the target document ID to the user terminal 30. In response to receiving the document data, the display control unit 31 of the user terminal 30 displays the document data on the display 106. As a result, the user is able to confirm the contents of the document data.

The login user is allowed to associate the document information collection result with the target query and save the document information collection results as a workspace.

Saving the collected result as the workspace is comparable to saving the collected result as a bookmark. In this case, the login user selects a selection component 525 that corresponds to the document information to associate with the target query and save in the workspace from among the selection components 525 arranged for each document information on the search result screen 520 (FIG. 10). For example, the login user selects one or more items of document information corresponding to the information to be stored in the workspace. All document information included in the collection result may be selected. In response to a pressing of a create workspace button 526 with one or more selection components 525 selected, the display control unit 31 of the user terminal 30 displays on the display 106, a screen for receiving input of a name to be given to the workspace (hereinafter referred to as a "workspace name"). In response to input of the workspace name by the login user through the screen, the display control unit 31 transmits a workspace generation request to the information collection apparatus 10, which includes the document ID of each item of document information corresponding to each selected selection component 525, the workspace name, and the target query. In response to receiving the generation request, the information collection apparatus 10 executes the process illustrated in FIG. 15, for example.

Figure 15:
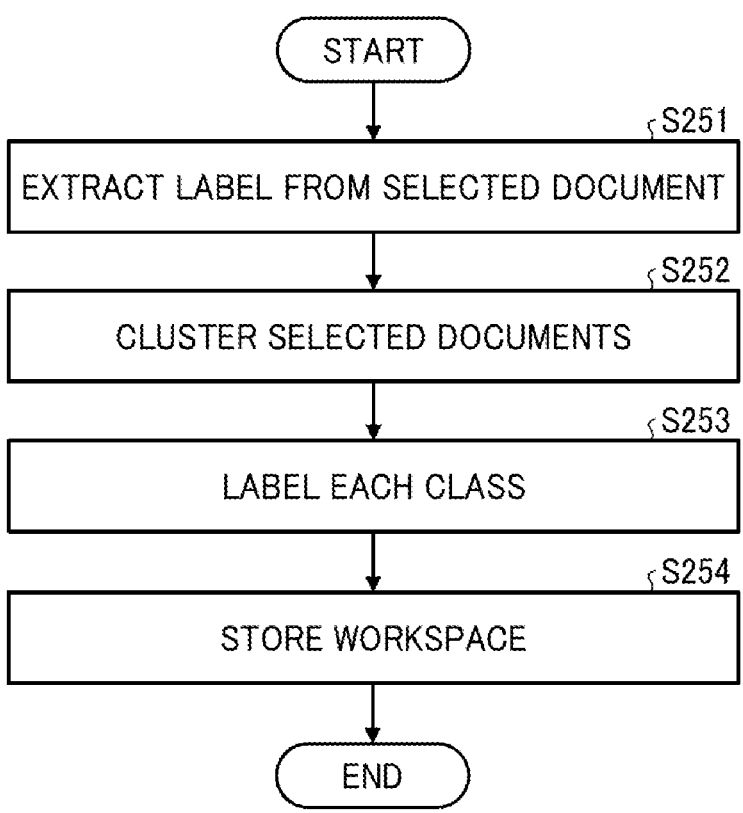
FIG. 15 is a flowchart illustrating an example of a workspace generation process.

FIG. 15 is a flowchart illustrating an example of a workspace generation process.

In step S251, the labeling unit 126 extracts some (predetermined number) relatively significant words from a set of one or more selected documents as a label for the workspace.

The label extraction method may be the same as described above.

In step S252, the classification unit 125 classifies the document vector of each item of selected document information (hereinafter referred to as "selected document information") into a plurality of classes (hereinafter referred to as a "belonging class") by clustering. The classification method into the classes may be the same as that described above (for example, step S206 in FIG. 7).

In step S253 the labeling unit 126 assigns the label to each belonging class. The method of assigning the label to the class to which the document information belongs may be the same as that described above (for example, step S207 in FIG. 7).

In step S254, the workspace generation unit 132 stores the workspace that associates the selected items of document information with the target query in the workspace storage unit 25 of the information management apparatus 20.

FIG. 16 is a diagram illustrating an example of a configuration of the workspace storage unit 25. As illustrated in FIG. 16, the workspace storage unit 25 stores, for each workspace, a workspace ID, workspace name, label, creator, updater, query, number of uses, evaluation scores, belonging data ID, belonging data path, belonging class label, and the like.

The workspace ID is workspace identification information, and is given to the workspace by the workspace generation unit 132 in step S254, for example. The workspace name is the name of the workspace input by the user, as described above. The creator is identification information (user ID, name, and the like) of the creator of the workspace. Here, the identification information of the login user is stored as the creator. The updater is the identification information (user ID, name, and the like) of the person who updated the workspace. The workspace is capable of updating. The query is a query (target query) input when collecting the document information that is a source of the workspace. The query is information indicating what kind of viewpoint the workspace is based on as a collection of the document information. The number of uses is the number of times the workspace is used (referenced). The evaluation score is an evaluation value input by the user who referred to the workspace. For example, the average value of numerical values in a five-level evaluation is the evaluation score. The belonging data ID is the document ID of each item of document information belonging to the workspace. The belonging data path is the file path of the document data related to each item of document information. The belonging class label is the label for each belonging class generated in step S253. Note that the same belonging class label is assigned for the document information classified into the same belonging class within the workspace.

As described above, the workspace is information associated with the document information. For example, in the document information collection result, the workspace associated with each item of document information is also collected. In this case, the search result screen 520 displayed in step S204 of FIG. 7 has a configuration as illustrated in FIG. 17, for example.

Figure 17:
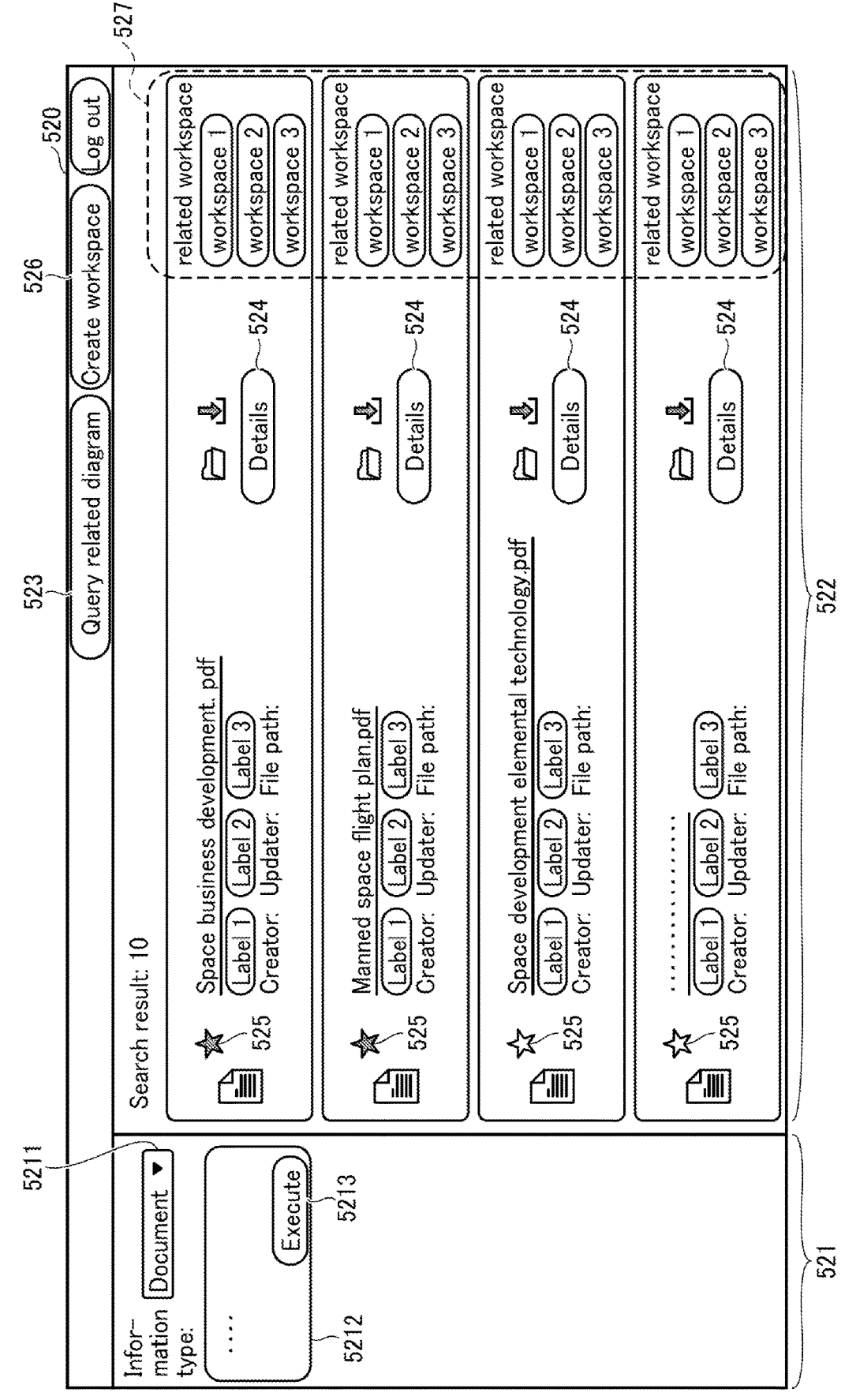
FIG. 17 is a diagram illustrating a second example of the search result screen.

FIG. 17 is a diagram illustrating a second example of the search result screen. In FIG. 17, the same reference numbers are allocated to the same functional units as those of FIG. 10, and redundant descriptions thereof are omitted below.

The search result screen 520 illustrated in FIG. 17 includes a related workspace display field 527. The related workspace display field 527 displays the workspace name of the workspace related to each item of document information. The workspace related to certain document information is a workspace that includes the document ID of the document information as the belonging data ID. For example, each workspace name is given information (for example, a link) to lead the user to the workspace.

By displaying a link to the workspace for each item of collected document information, the user is able to obtain other document information related to the collected document information based on the workspace.

Figures 18, 19:
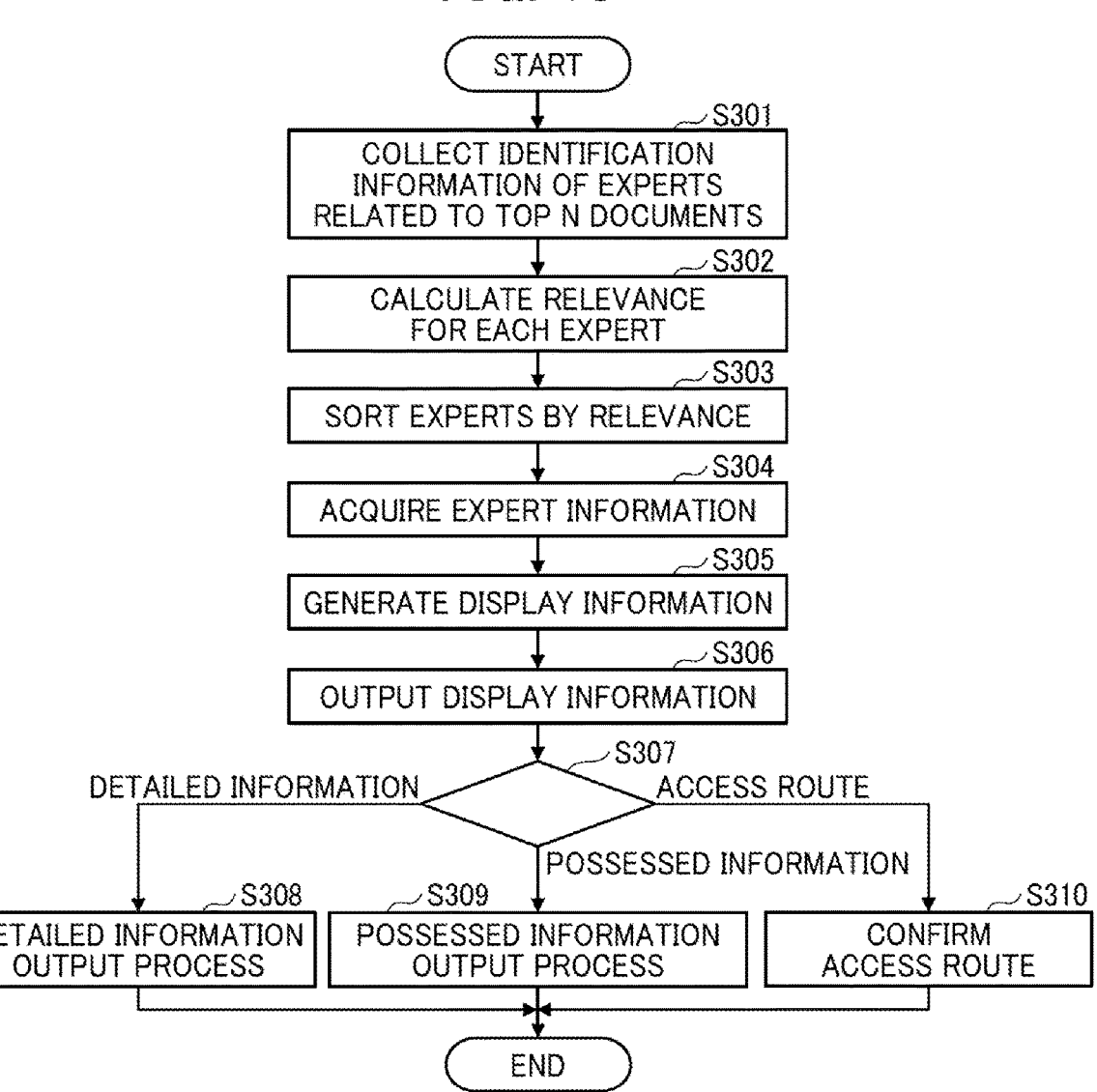
FIG. 18 is a flowchart illustrating an example of an expert collection result output process.
FIG. 19 is a diagram illustrating an example of a result of sorting experts.

The details of step S107 of FIG. 4 is described in the following. FIG. 18 is a flowchart illustrating an example of an expert collection result output process.

In step S301, the expert collection unit 128 collects (extracts) the identification information of experts related to the document information (hereinafter referred to as "target document information") related to the top N document vectors extracted in step S104 of FIG. 4, for example, referring to the document information storage unit 22 (FIG. 8). The identification information of the expert related to certain document information is identification information related to a person who is presumed to be the expert on the document information. In the present embodiment, the creator or updater of the document information is assumed to be the expert on the document information. This is because the creator or the updater is considered to be familiar with the content included in the document data related to the document information or knows the content of the document data with a high possibility. Accordingly, the expert collection unit 128 refers to the document information storage unit 22 (FIG. 8) and collects the employee ID of the creator or updater as the expert identification information for each target document information.

In step S302, the expert collection unit 128 calculates relevance with the target query for each collected employee ID (for each expert). The relevance with the target query is an index that indicates a degree of association with the target query. The relevance with the target query for a certain expert is a value based on the similarity calculated in step S103 of FIG. 4 for the document information for which the subject expert is the creator or the updater among the top N items of document information. In this case, for example, the average or total of the similarity may be used as the relevance. Furthermore, considering the accessibility (case of access) from the user who entered the target query (login user), an index indicating a proximity to the login user may be added to the relevance of each expert. The index may be evaluated based on a distance between the department to which the login user belongs and the department to which the expert belongs. The distance between the departments is to be evaluated based on organization information. For example, the distance between a department A and a department B is a value based on the total number of hierarchies between the department A and the department B from the common upper organization (such as division, headquarters, and the like). In this case, the smaller the total (that is, the closer the distance), the larger the value is added to the relevance. The organization information is stored in the organization information storage unit 24. Alternatively, the index may be evaluated based on an amount of communication inside the company between the login user and the expert. For example, the index may be calculated based on e-mail exchanges, chat exchanges, the number of participations in the same meeting, and the like inside the company. In this case, the value of the relevance may be set larger for an expert who communicates more with the login user. The relevance may be calculated by other methods.

In step S303, the expert collection unit 128 sorts the identification information of the experts in descending order of relevance.

FIG. 19 is a diagram illustrating an example of a result of sorting the experts. FIG. 19 illustrates an example in which the identification information of experts is sorted in descending order of relevance. In FIG. 19, as an example, the name of the expert is used as the identification information.

In the case the number of experts collected exceeds a threshold (for example, M), the expert collection unit 128 extracts the top M experts in terms of relevance, and use the extracted experts in subsequent steps.

In step S304, the expert collection unit 128 acquires the employee information of the expert (hereinafter referred to as "expert information") from the employee information storage unit 23 of the information management apparatus 20 based on the identification information of the expert. The employee information storage unit 23 stores the employee information for each employee to be shared within the company, such as a name, a department, and the like and contact information (a telephone number, an email address, and the like).

In step S305, the display information generation unit 130 generates display information to display the sorting result as the collection result of expert information.

In step S306, the display information transmission unit 131 and the display control unit 31 of the user terminal 30 executes the display information output process. Specifically, the display information transmission unit 131 transmits display information to the user terminal 30. The display control unit 31 of the user terminal 30 displays on the display 106, the expert collection result screen based on the display information. The expert collection result screen has, for example, the same configuration as the search result screen (FIG. 10), and is a screen that includes a list of expert information sorted in step S303 in the search result display field 522.

In response to a selection of any one item of expert information on the expert collection result screen followed by input of an instruction to display detailed information, the display control unit 31 of the user terminal 30 transmits a detailed information display request including the employee ID related to the selected expert information to the information collection apparatus 10. In response to receiving the detailed information display request ("DETAILED INFORMATION" in step S307), the information collection apparatus 10 executes the detailed information output process for the expert related to the employee ID included in the detailed information display request in step S308. For example, the display information generation unit 130 acquires various information (hereinafter referred to as "detailed information") associated with the employee ID from the employee information storage unit 23 or other databases included in the information management apparatus 20, and generates display information for a screen displaying the acquired detailed information (hereinafter referred to as an "expert details screen"). The display information transmission unit 131 transmits the display information to the user terminal 30, and the display control unit 31 of the user terminal 30 displays the expert details screen based on the display information on the display 106. The login user is able to obtain detailed information related to the expert by referring to the expert details screen.

Alternatively, in response to a selection of any one item of expert information on the expert collection screen followed by input of an instruction to display possessed information, the display control unit 31 of the user terminal 30 transmits a possessed information display request including the employee ID related to the selected expert information to the information collection apparatus 10. In response to receiving the possessed information display request ("POSSESSED INFORMATION" in step S307), the information collection apparatus 10 executes possessed information output process for the expert associated with the employee ID included in the possessed information display request in step S309. For example, the display information generation unit 130 acquires a list of document information that includes the employee ID as the creator or the updater from the document information storage unit 22 (FIG. 8). The acquired document information is considered to be document information related to the document data that includes information possessed by the expert. The display information generation unit 130 generates display information for a screen (hereinafter referred to as a "possessed information screen") to display a list of acquired document information. The display information transmission unit 131 transmits the display information to the user terminal 30, and the display control unit 31 of the user terminal 30 displays on the display 106 a possessed information screen based on the display information. The login user is able to check the information possessed by the relevant expert by referring to the possessed information screen. The workspace (FIG. 16) in which the expert is the creator or the updater may also be displayed on the possessed information screen.

Alternatively, in response to a selection of any one item of expert information on the expert collection screen followed by an input of an access route display instruction, the display control unit 31 of the user terminal 30 transmits an access route display request including the employee ID related to the selected expert information to the information collection apparatus 10. In response to receiving the access route display request ("ACCESS ROUTE" in step S307), the information collection apparatus 10 executes an access route output process for the expert associated with the employee ID included in the access route display request in step S310. The access route is information indicating a route for the login user to access the expert. For example, in a graph representing the organizational structure of a company (for example, a tree structure), the access route may be a route from the department to which the login user belongs to the department to which the relevant expert belongs. In this case, the display information generation unit 130 is capable of specifying the access route based on the organization information. Alternatively, the access route may be a human relationship route from the login user to the expert. In this case, for example, the display information generation unit 130 recursively searches for acquaintances of the login user from an e-mail history, a chat history, a meeting history, and the like stored in a database inside the company and a list of acquaintances searched until the expert appears as an acquaintance may be acquired as the access route. The display information generation unit 130 generates display information for a screen that displays the acquired access route (hereinafter referred to as "access route screen"). The display information transmission unit 131 transmits the display information to the user terminal 30, and the display control unit 31 of the user terminal 30 displays on the display 106, the access route screen based on the display information.

For example, by displaying the "expert name" (for example, "EMPLOYEE T.S."

who has the highest degree of relevance) in the position of the document name "Space Business Development.pdf" located in the middle of the example of the document related diagram in FIG. 14 described above, searching for knowledge and experts is facilitated by intuitively grasping a diagram of the relationship between people and the information possessed by the people, and the access route to experts from the correlation diagram of information possessed by people. The login user is able to obtain a clue for accessing the expert by referring to the access route screen.

Figures 20, 21:
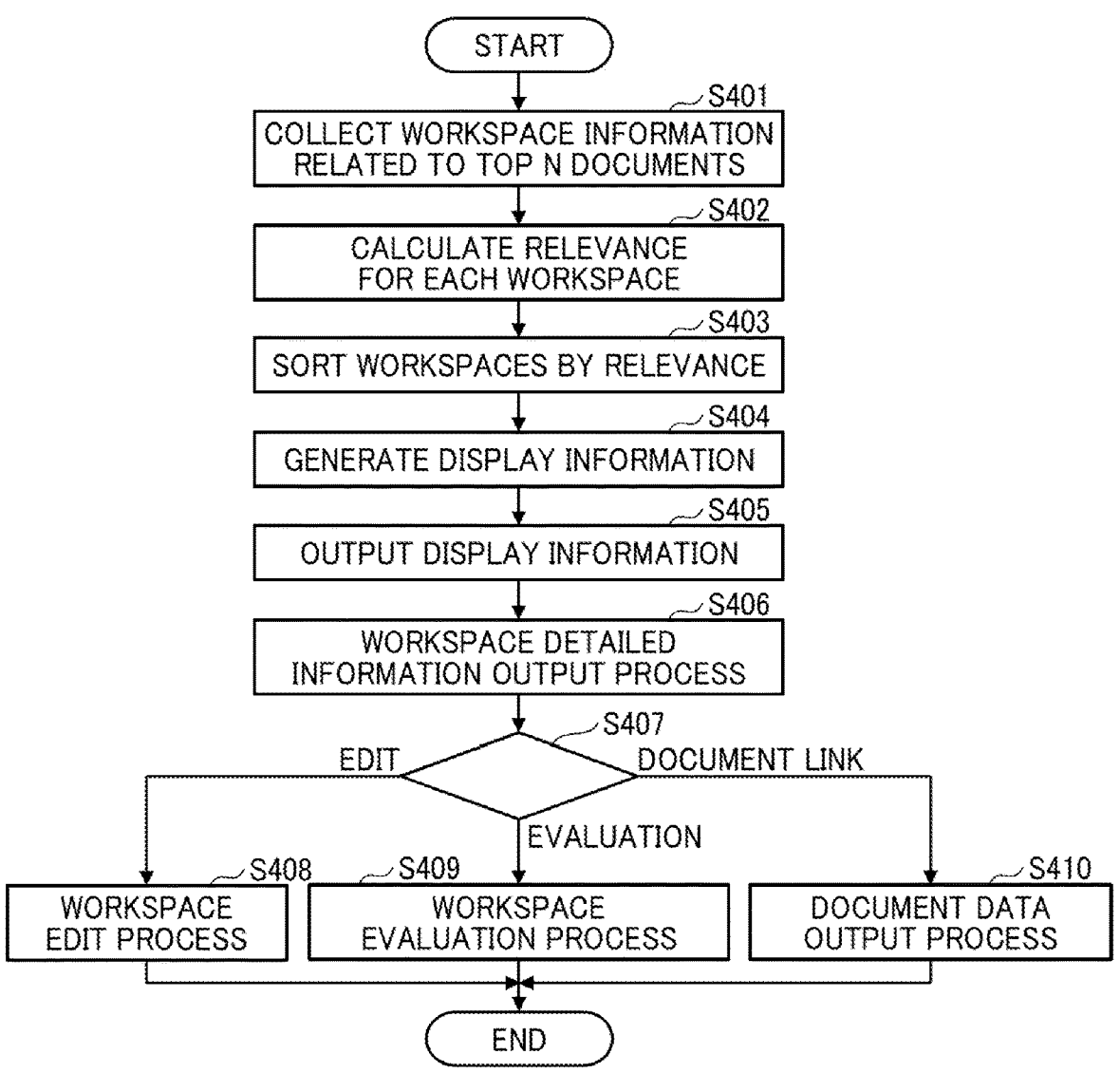
FIG. 20 is a flowchart illustrating an example of a workspace collection result output process.
FIG. 21 is a diagram illustrating an example of a result of sorting workspaces.

The details of step S108 of FIG. 4 are described in the following. FIG. 20 is a flowchart illustrating an example of a workspace collection result output process.

In step S401, the workspace collection unit 129 collects the workspaces related to the document information (hereinafter referred to as "target document information") related to the top N document vectors extracted in step S104 in FIG. 4 from the workspace storage unit 25 (FIG. 16). The identification information of the workspace related to certain document information is a workspace that is a collection result of the document information (including the document ID of the document information as the belonging data ID).

In step S402, the workspace collection unit 129 calculates the relevance with the target query for each collected workspace. The relevance with the target query is an index that indicates a strength of the relationship with the target query. The relevance of a certain workspace with the target query may be a value based on the similarity calculated in step S103 of FIG. 4 for the document information related to the workspace among the top N items of document information. In this case, for example, the average or total of the similarity may be used as the relevance.

In step S403, the workspace collection unit 129 sorts the workspaces in descending order of relevance.

FIG. 21 is a diagram illustrating an example of a workspace sorting result. FIG. 21 illustrates an example in which workspaces are sorted in descending order of relevance.

In the case the number of workspaces exceeds the threshold (in this example, M), the workspace collection unit 129 extracts the top M workspaces in terms of relevance, and the extracted workspaces are processed in subsequent steps.

In step S404, the display information generation unit 130 generates display information for displaying the sort results as workspace collection results.

In step S405, the display information transmission unit 131 and the display control unit 31 of the user terminal 30 execute the display information output process. Specifically, the display information transmission unit 131 transmits the display information to the user terminal 30. The display control unit 31 of the user terminal 30 displays on the display 106, the workspace collection result screen based on the display information.

Figure 22:
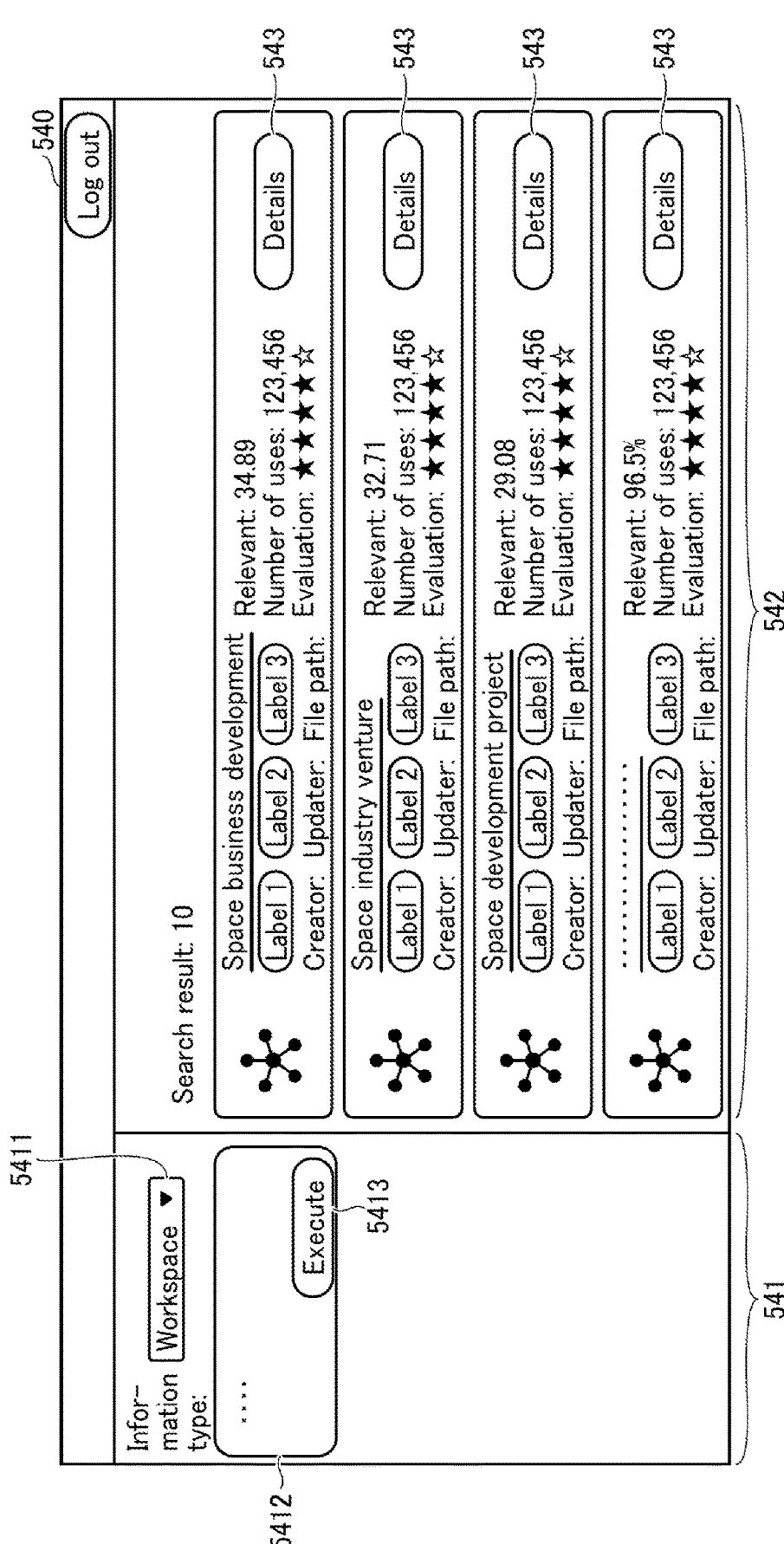
FIG. 22 is a diagram illustrating an example of a workspace collection result screen.

FIG. 22 is a diagram illustrating an example of a workspace collection result screen. As illustrated in FIG. 22, the workspace collection result screen 540 includes an information collection condition display field 541 and a search result display field 542.

The information collection condition display field 541 is a field for displaying the target collection condition, and includes an information type display field 5411 and a query display field 5412. The functions of the information type display field 5411 and the query display field 5412 are the same as the functions of the information type display field 5211 and the query display field 5212 on the search result screen 520 (FIG. 10).

The search result display field 542 is a field to display a sorted list of workspaces.

By referring to the workspace collection result screen 540, the login user is able to check a list of workspaces collected according to the target collection condition.

In response to a pressing of the details button 524 corresponding to any workspace on the workspace collection result screen 540, the display control unit 31 of the user terminal 30 sends a request corresponding to the details button 524 to the information collection apparatus 10. The request includes, for example, the workspace ID of the workspace.

In response to receiving the request, the display information generation unit 130 of the information collection apparatus 10 executes a detailed information output process for the workspace (hereinafter referred to as a "target workspace") related to the workspace ID (hereinafter referred to as a "target workspace ID") included in the request in step S406. Specifically, the display information generation unit 130 refers to the workspace storage unit 25 and generates display information for a screen (hereinafter referred to as a "workspace details screen") that displays more detailed information than the display content on the workspace collection result screen 540 regarding the target workspace. The display information transmission unit 131 transmits the display information to the user terminal 30, and the display control unit 31 of the user terminal 30 displays on the display, the workspace details screen based on the display information.

Figure 23:
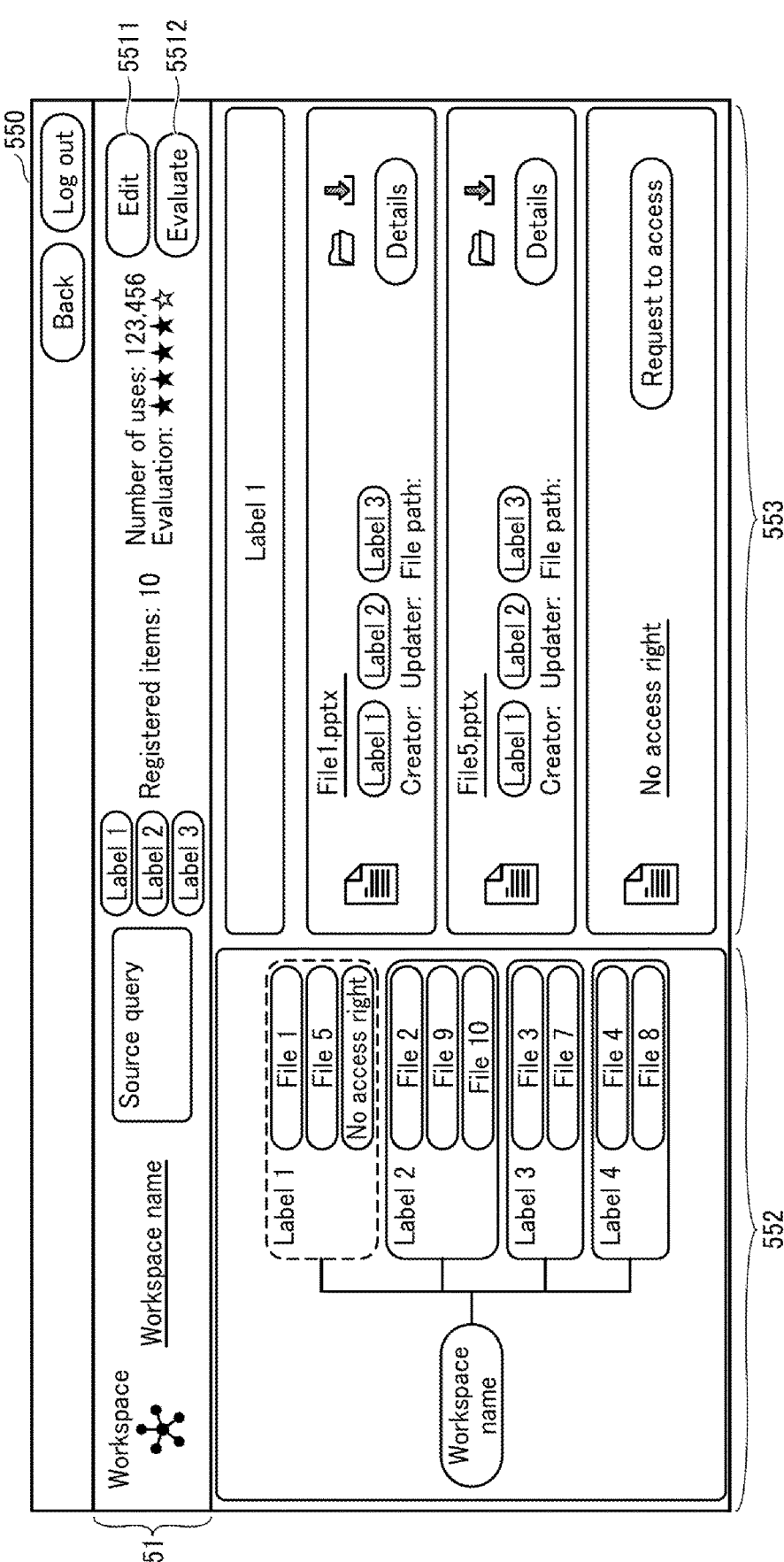
FIG. 23 is a diagram illustrating an example of a workspace details screen.

FIG. 23 is a diagram illustrating an example of a workspace details screen. As illustrated in FIG. 23, the workspace details screen 550 includes a basic information display field 551, a configuration display field 552, a related document display field 553, and the like.

The basic information display field 551 is a field that includes the content displayed on the workspace collection result screen 540, an edit button 5511, and an evaluate button 5512 regarding the target workspace.

The configuration display field 552 includes information indicating the relationship between a group of document information belonging to the target workspace that can be specified based on the belonging class label and belonging data ID of the target workspace (FIG. 16), and the class that classifies the document information group. FIG. 23 illustrates an example in which three classes belong to the target workspace.

The belonging document display field 553 is a field that includes a list of document information belonging to the class selected in the configuration display field 552 (hereinafter referred to as a "target class"). In FIG. 23, "No access right" is displayed for the third item of document information. "No access rights" indicates that the login user does not have the access right to the document information.

The login user is allowed to edit the workspace through the workspace details screen 550. For example, any document information belonging to the target workspace can be deleted from the target workspace, or certain document information can be added to the target workspace. In response to a pressing of the edit button 5511 by the login user after performing such an editing operation, the user terminal 30 transmits the edited content to the information collection apparatus 10. In response to receiving the edited content ("EDIT" in step S407), the workspace editing unit 133 of the information collection apparatus 10 reflects the edited content in the record corresponding to the target workspace in the workspace storage unit 25 (FIG. 16) in step S408.

Alternatively, in response to a pressing of an evaluate button 5512 on the workspace details screen 550, the display control unit 31 of the user terminal 30 displays a screen for receiving input of an evaluation score. In response to input of any evaluation score from 0 to 5 on the screen, the display control unit 31 of the user terminal 30 transmits the input evaluation score to the information collection apparatus 10. In response to receiving the evaluation score ("EVALUATION" in step S407), the workspace generation unit 132 of the information collection apparatus 10 updates the number of uses and the evaluation score of the record corresponding to the target workspace in the workspace storage unit 25 (FIG. 16) in step S409. Specifically, the workspace generation unit 132 adds 1 to the number of uses. Regarding evaluation scores, in the case the number of uses before update is x1, the number of uses after update is x2, and the evaluation score before update is y1, the workspace generation unit 132 calculates the evaluation score y2 after update as follows.

$$y2 = y1 \times x1/x2$$

Alternatively, in response to a selection of a link for any document name in the related document display field 553 of the workspace details screen 550, the user terminal 30, information collection apparatus 10, and information management apparatus 20 execute the document data output process in step S410. The document data output process is as described in step S214 of FIG. 7. As a result of the document data output process, the user is able to confirm the content of the document data related to the document name.

As described above, according to the first embodiment, information corresponding to the information type and the query specified (selected) by the user is collected and presented (displayed) to the user. At this time, in addition to the information directly collected based on the query, information related to the information is presented. Accordingly, efficiency regarding information collection is improved.

Furthermore, by enabling collection of the workspaces that are the results of past information collection, each user efficiently collects the results of information collection by other users. For example, even in the case the content of the query is not appropriate, the possibility of obtaining desired information is increased based on the workspaces stored by other users.

The information desired by users and the knowledge obtained from various related information assets are useful, for example, in other efforts and work, and with a system that streamlines access to such data (collection of information), the users are able to free up time and increase opportunities to concentrate to create new value through more creative work.

Hereinafter, a description is given of a second embodiment. The differences from the first embodiment is described in the second embodiment. Points that are not particularly mentioned may be the same as those described in the first embodiment.

FIG. 24 is a diagram illustrating an example of a configuration of an information collection system according to a second embodiment. In FIG. 24, the same reference numbers are allocated to the same functional units as those of FIG. 1, and redundant descriptions thereof are omitted below.

In FIG. 24, a remote meeting device 40 connects to the information management apparatus 20 through a network N4. The remote meeting device 40 is a device or computer used for remote meetings such as video meetings or web meetings. For example, the remote meeting device 40 is an information processing apparatus provided in a meeting room or the like, equipped with a camera and a microphone. Alternatively, the remote meeting device 40 may be an information processing apparatus (server computer) connected to the information processing apparatus through a network. The remote meeting device 40 manages information related to the remote meetings (hereinafter referred to as "meeting information"). The information management apparatus 20 acquires and stores the meeting information managed by the remote meeting device 40.

In addition to the remote meeting device 40, audio devices such as an integrated circuit (IC) recorder 41 used for recording audio, devices such as a smart glasses 42 that store video data seen with the eyes, various devices and systems (devices A, B, . . . ) that use a certain service (function) such as a recording device such as a wearable device 43, and various external databases (databases A, B, . . . ) that store information on experts in various fields (doctors, lawyers, and the like) and intellectuals (scholars, university professors, and the like), such as an external expert information database (DB) may be connected to the information management apparatus 20 through the network N4. Thereby, similar to the remote meeting device 40, useful information stored in various systems or various databases connected to the information collection system can be collected.

In the present embodiment, the remote meeting device 40 is described as an example.

Figure 25:
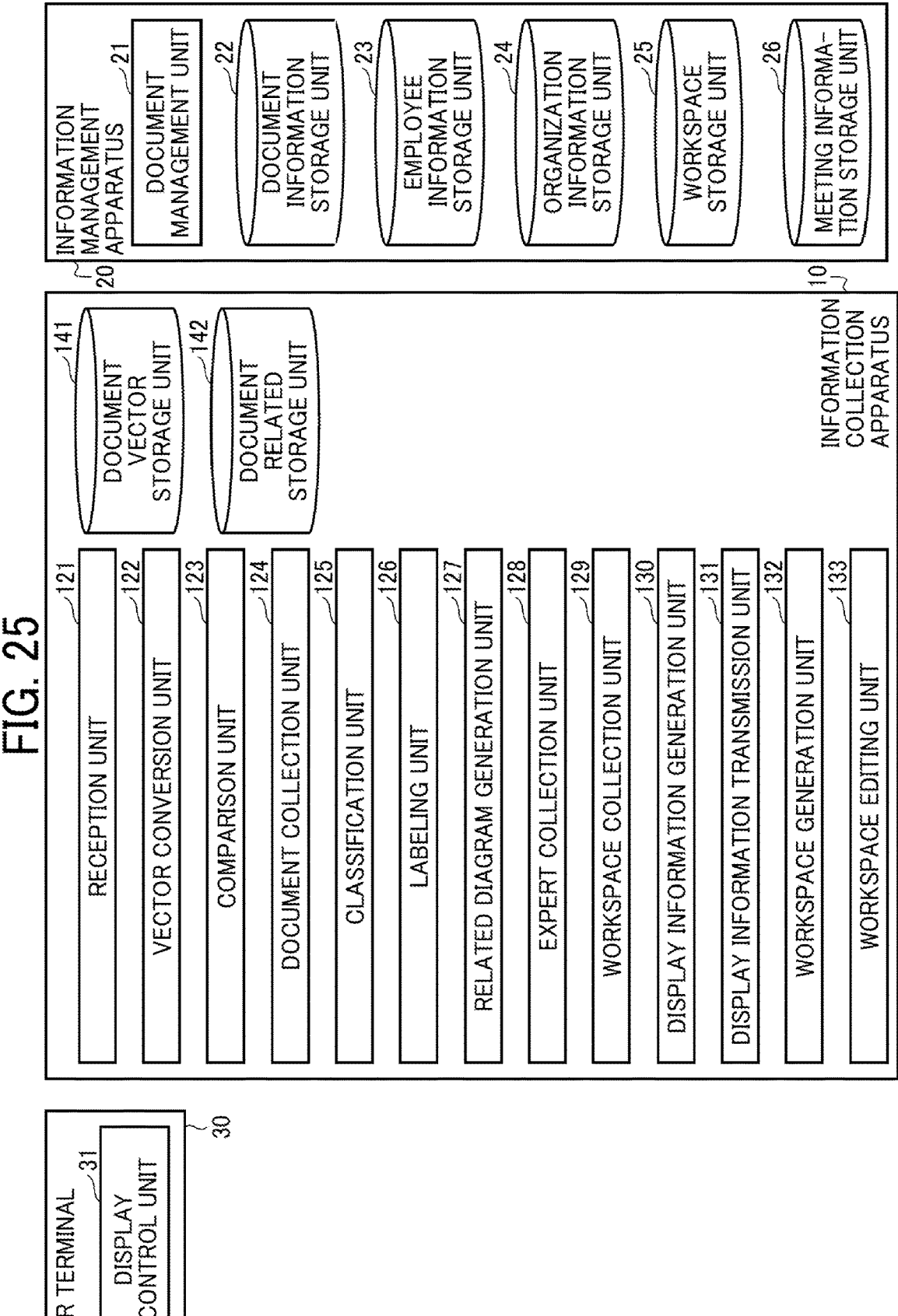
FIG. 25 is a diagram illustrating an example of a functional configuration of an information collection system according to the second embodiment.

FIG. 25 is a diagram illustrating an example of a functional configuration of the information collection system according to the second embodiment.

In FIG. 25, the same reference numbers are allocated to the same functional units as those of FIG. 3, and redundant descriptions thereof are omitted below.

As illustrated in FIG. 25, the information management apparatus 20 further includes a meeting information storage unit 26. The meeting information storage unit 26 is implemented by, for example, an auxiliary storage of the information management apparatus 20 or a storage connectable to the information management apparatus 20 through a network.

FIG. 26 is a diagram illustrating an example of a configuration of the meeting information storage unit 26. As illustrated in FIG. 26, the meeting information storage unit 26 stores a meeting name, a meeting date, a participant, and the like for each meeting held, and a material type, a material ID, and the like for each material related to the meeting (used in the meeting).

The meeting name is the name of the meeting. The meeting date is the date on which the meeting was held. The participant is the employee ID of each employee (including an organizer) who participated in the meeting. A subject is an agenda of the meeting.

The material type is the type of each material related to the meeting. The material types include, for example, "distributed materials," "minutes." "video recording." and "audio recording." The "distributed materials" are document data such as materials distributed for the meeting. The "minutes" is document data of minutes of a meeting. The "video recording" is video data that records the meeting. The "audio recording" is audio data that records the meeting. The material ID is identification information of each material related to the meeting. Since a material whose material type is "distributed material" or "minutes" is document data, the document ID of the document data is used as the material ID. Accordingly, the document information of these document data is also stored in the document information storage unit 22. On the other hand, for materials whose material type is "video" or "audio", the URL of the storage destination of the video data or audio data, and the like is used as the material ID. Alternatively, in the case the document data includes video data and audio data, document information of materials whose material type is "video" or "audio" is stored in the document information storage unit 22. In this case, the material ID of the data of the material which is "video" or "audio" is used as the document ID.

In the second embodiment, in step S201 in FIG. 7, regarding the document information related to the meeting, the document collection unit 124 further acquires (collects) meeting information from the meeting information storage unit 26 in addition to the document information with the top N items in similarity. The document information related to the meeting refers to the document information related to the document ID that matches any document ID related to the meeting information of the meeting. For example, the document information corresponding to the distributed materials, the minutes, or the like related to the meeting information of a certain meeting is the document information related to the meeting. As a result, for example, the following information is collected regarding the document information related to the meeting.

FIG. 27 is a diagram illustrating an example of information additionally collected regarding the document information related to the meeting. In FIG. 27, the meeting name and date, the subject, the related material ID, and the like are included for each document ID of a plurality of items of document information. In other words, FIG. 27 illustrates an example in which the meeting name and date, the subject, the related material ID, and the like are additionally collected for each item of document information. The meeting name and date are information including the meeting name and the date of the meeting. The subject is agenda of the meeting. The related material ID is a material ID of materials related to the meeting (recorded data, recorded data, and the like) in addition to the document data (minutes, distributed materials, and the like) related to the document ID.

In step S203 of FIG. 7, the display information generation unit 130 generates display information for the document information related to the meeting so as to include the meeting information of the meeting. At this time, the display information generation unit 130 includes the video or audio material ID (for example, a URL or the like or identification information embedded with a link such as a URL) included in the meeting information in the display information to facilitate accessing the video or audio. As a result, the login user is enabled to obtain, regarding the document information related to the meeting, information on the meeting in which the document data related to the document information was used.

In step S301 in FIG. 18, the expert collection unit 128 collects the employee IDs of the participants in the meeting information as identification information of the experts for the document information whose document ID is the material ID of any meeting information among the top N document information. The reason is that the participant in such a meeting is considered to have knowledge (information) regarding the document data related to the document information with high probability. Furthermore, as illustrated in FIG. 24, the expert collection unit 128 acquires the information on experts from an external database such as an external expert DB in addition to the above-mentioned remote meeting device.

As described above, according to the second embodiment, information related to the meeting that the user desires can be efficiently collected. As mentioned above, the knowledge obtained from past accumulated meeting information (including related materials, documents, videos, audio, and the like) is useful for the user and with the mechanism that streamlines access to the data (collection of information) desired by the user, the user is able to take advantage of opportunities to create new value through more creative work.

In the above embodiments, the information collection apparatus 10 is an example of an information processing apparatus.

The query vector is an example of first information. The document vector is an example of second information. The workspace is an example of related information. The workspace generation unit 132 is an example of a related information generation unit. The workspace editing unit 133 is an example of a related information editing unit. The document data related to N items of document information is an example of target data.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Aspects of the present disclosure are, for example, as follows.

According to a first aspect, an information processing apparatus includes, a reception unit to receive an information type of a collection target and a character string related to the collection target, a comparison unit to compare first information obtained by analyzing the character string and a plurality of items of second information obtained by analyzing each of a plurality of data stored in a storage unit, and a display information generation unit to generate display information to display on a display, information for each information type, among the information related to one or more target data extracted from the plurality of data based on a comparison result.

According to a second aspect, the information processing apparatus of the first aspect further includes a classification unit to classify the one or more target data based on the second information related to the target data, and the display information generation unit generates display information indicating a classification result by the classification unit.

According to a third aspect, in the information processing apparatus of the first aspect or the second aspect, the display information generation unit generates for each information type, display information to display on the display, information on a person related to the target data, based on similarity between the target data related to the person and the character string.

According to a fourth aspect, the information processing apparatus of any one of the first aspect to the third aspect further includes a related information generation unit to generate related information that associates the one or more target data based on the same character string and stores the related information in the storage unit, and the display information generation unit generates for each information type, display information to display the related information related to the target data based on similarity between the target data related to the related information and the character string.

According to a fifth aspect, the information processing apparatus of the fourth aspect further includes a related information editing unit to reflect edited content of the related information to the related information stored in the storage unit.

According to a sixth aspect, in the information processing apparatus of any one of the first aspect to the fifth aspect, the display information includes at least one of information indicating that an access to the target data is authorized, or information indicating that the access to the target data is unauthorized.

According to a seventh aspect, in the information processing apparatus of any one of the first aspect to the sixth aspect, the information related to the target data is information regarding at least one of a document, an image, video, or a person.

According to an eighth aspect, in the information processing apparatus of the second aspect, the information on a person related to the target data is information regarding at least one of a creator of the target data, an updater of the target data, or a participant in a meeting using the target data.

According to a ninth aspect, in the information processing apparatus of any one of the first aspect to the eighth aspect, the first information is information obtained by converting the character string into a vector, and the second information is information obtained by converting each of a plurality of data into a vector, and the comparison unit compares the vector related to the first information and the vector related to the second information.

According to a tenth aspect, in the information processing apparatus of any one of the first aspect to the ninth aspect, in a case the information related to the target data is information regarding a meeting using the target data, the display information generation unit generates the display information to include information to allow access to at least one of video or audio related to the meeting.

According to an eleventh aspect, in the information processing apparatus of the fourth aspect, the display information generation unit generates, for each of the target data, display information including information to lead to the related information related to the target data.

According to a twelfth aspect, the information processing apparatus of the second aspect further includes a related diagram generation unit to generate a diagram illustrating a relationship between one or more of the target data and the character string based on the classification result by the classification unit, and the display information generation unit generates display information including the diagram.

According to a thirteenth aspect, the information processing apparatus of the second aspect further includes a labeling unit to assign a label based on a word included in the target data to each set of the target data classified by the classification unit.

According to a fourteenth aspect, in the information processing apparatus of any one of the first aspect to the thirteenth aspect, the comparison unit searches for the one or more target data from the plurality of data based on the first information and the second information.

According to a fifteenth aspect, an information processing system includes, a reception unit to receive an information type of a collection target and a character string related to the collection target, a comparison unit to compare first information obtained by analyzing the character string and a plurality of items of second information obtained by analyzing each of a plurality of data stored in a storage unit, and a display information generation unit to generate display information to display on a display, information for each information type, among the information related to one or more target data extracted from the plurality of data based on a comparison result.

According to a sixteenth aspect, an information processing method executed by a general computer including, a reception step to receive an information type of a collection target and a character string related to the collection target, a comparison step to compare first information obtained by analyzing the character string and a plurality of items of second information obtained by analyzing each of a plurality of data stored in a storage unit, and a display information generation step to generate display information to display on a display, information for each information type, among the information related to one or more target data extracted from the plurality of data based on a comparison result.

According to a seventeenth aspect, a program to cause a general computer to perform an information processing method including, a reception step to receive an information type of a collection target and a character string related to the collection target, a comparison step to compare first information obtained by analyzing the character string and a plurality of items of second information obtained by analyzing each of a plurality of data stored in a storage unit, and a display information generation step to generate display information to display on a display, information for each information type, among the information related to one or more target data extracted from the plurality of data based on a comparison result.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
receive a request from a user which designates an expert as an information type of a collection target and a character string related to the collection target;
convert the character string to a first vector represented by distributed representation that is an expression according to a meaning contained in data to be converted;
convert a plurality of items of document data to second vectors represented by the distributed representation, respectively, the plurality of items of document data stored in one or more memories as target data including document data created or updated by a person;
calculate a similarity between the first vector and the second vectors for each of the plurality of items of document data;
extract the second vector with a similarity that satisfies a predetermined requirement;
acquire an item, corresponding to the second vector extracted, among the plurality of items of document data;
collect identification information of the person who created or updated the item acquired as corresponding to the second vector extracted; and
generate display information, the display information causing a display to display a list including the identification information of the person.

2. The information processing apparatus of claim 1, wherein
the circuitry is further configured to:
classify the target data based on the second vectors of the target data,
the display information indicating a classification result.

3. The information processing apparatus of claim 2, wherein
the circuitry is further configured to:
generate a diagram illustrating a relationship between the target data and the character string based on the classification result,
the display information including the diagram.

4. The information processing apparatus of claim 2, wherein
the circuitry is further configured to assign a label based on a word included in the target data, for each set of the classified target data.

5. The information processing apparatus of claim 1, wherein
the circuitry is configured to generate, according to the information type, the display information for displaying information on the person related to the target data, based on a similarity between the target data and the character string.

6. The information processing apparatus of claim 1, wherein
the circuitry is further configured to:
generate related information that associates the target data selected based on the same character string, and stores the related information in the one or more memories; and
generate, according to the information type, the display information for displaying the related information related to the target data based on a similarity between the target data and the character string.

7. The information processing apparatus of claim 6, wherein
the circuitry is further configured to reflect edited content of the related information to the related information stored in the one or more memories.

8. The information processing apparatus of claim 6, wherein
the circuitry is further configured to generate, for each target data, display information including information that guides the user to the related information related to the target data.

9. The information processing apparatus of claim 1, wherein
the display information includes information indicating that an access to the target data is authorized or unauthorized.

10. The information processing apparatus of claim 1, wherein
the information related to the target data further includes an image or video.

11. The information processing apparatus of claim 1, wherein
in a case in which the information related to the target data is information regarding a meeting using the target data, the circuitry is configured to generate the display information to include information that allows access to at least one of video or audio related to the meeting.

12. The information processing apparatus of claim 1, wherein
the circuitry is configured to search for the target data from the plurality of items of data based on the first vector and the second vectors.

13. The information processing apparatus of claim 1, wherein
the plurality of items of data are converted to the second vectors in advance before receiving the character string.

14. The information processing apparatus of claim 1, wherein
the information type further includes a workspace and a document.

15. The information processing apparatus of claim 1, wherein
the circuitry is further configured to:
transmit the display information to a user terminal connected to the information processing apparatus; and
cause the user terminal to display information sorted by the similarity so that the user has access to the sorted information.

16. The information processing apparatus of claim 1, wherein
the circuitry is further configured to:
acquire employee information of the person from an employee information storage based on the identification information of the person, the employee information including a name and contact information of the person, and a department in a company to which the person belongs; and generate the display information to include the employee information.

17. The information processing apparatus of claim 1, wherein the circuitry is further configured to:

acquire employee information of the user and the person from an employee information storage; and in a case in which the user and the person belong to a company, evaluate accessibility from the user to the person based on an index indicating a distance between a department in the company to which the user belongs and a department in the company to which the person belongs.

18. An information processing system comprising:

circuitry configured to:

receive a request from a user which designates an expert as an information type of a collection target and a character string related to the collection target;

convert the character string to a first vector represented by distributed representation that is an expression according to a meaning contained in data to be converted;

convert a plurality of items of document data to second vectors represented by the distributed representation, respectively, the plurality of items of document data stored in one or more memories as target data including document data created or updated by a person;

calculate a similarity between the first vector and the second vectors for each of the plurality of items of document data;

extract the second vector with a similarity that satisfies a predetermined requirement;

acquire an item, corresponding to the second vector extracted, among the plurality of items of document data;

collect identification information of the person who created or updated the item acquired as corresponding to the second vector extracted; and generate display information, the display information causing a display to display a list including the identification information of the person.

19. An information processing method, comprising:

receiving a request from a user which designates an expert as an information type of a collection target and a character string related to the collection target;

converting the character string to a first vector represented by distributed representation that is an expression according to a meaning contained in data to be converted;

converting a plurality of items of document data to second vectors represented by the distributed representation, respectively, the plurality of items of document data stored in one or more memories as target data including document data created or updated by a person;

calculating a similarity between the first vector and the second vectors for each of the plurality of items of document data;

extracting the second vector with a similarity that satisfies a predetermined requirement;

acquiring an item, corresponding to the second vector extracted, among the plurality of items of document data;

collecting identification information of the person who created or updated the item acquired as corresponding to the second vector extracted; and generating display information, the display information causing a display to display a list including the identification information of the person.

20. A non-transitory recording medium storing a plurality of instructions which, when executed by one or more processors, cause the processors to perform the information processing method of claim 19.

* * * * *